(12) United States Patent
Ishii et al.

(10) Patent No.: US 7,573,633 B2
(45) Date of Patent: Aug. 11, 2009

(54) INCREASE GRAY SCALES OF PROJECTION SYSTEM BY REFLECTING LIGHT FROM MIRROR ELEMENTS WITH NON-UNIFORM INTENSITY DISTRIBUTION

(75) Inventors: Fusao Ishii, Menlo Park, CA (US);
Yoshihiro Maeda, Hachioji (JP);
Hirotoshi Ichikawa, Hchioji (JP);
Kazuma Arai, Hachioji (JP)

(73) Assignees: Silicon Quest Kabushiki-Kaisha (JP);
Olympus Corporation (JP)

( * ) Notice: Subject to any disclaimer, the term of this patent is extended or adjusted under 35 U.S.C. 154(b) by 27 days.

(21) Appl. No.: 11/821,955

(22) Filed: Jun. 25, 2007

(65) Prior Publication Data

US 2007/0296924 A1      Dec. 27, 2007

Related U.S. Application Data

(63) Continuation-in-part of application No. 11/121,543, filed on May 4, 2005, which is a continuation-in-part of application No. 10/698,620, filed on Nov. 1, 2003, which is a continuation-in-part of application No. 10/699,140, filed on Nov. 1, 2003, which is a continuation-in-part of application No. 10/699,143, filed on Nov. 1, 2003.

(60) Provisional application No. 60/816,452, filed on Jun. 26, 2006.

(51) Int. Cl.
*G02B 26/00* (2006.01)
*G09G 5/10* (2006.01)

(52) U.S. Cl. .................. 359/292; 345/690; 345/691

(58) Field of Classification Search ............. 345/84, 345/85, 690, 691; 359/292
See application file for complete search history.

(56) References Cited

U.S. PATENT DOCUMENTS

| 4,728,185 A | 3/1988 | Thomas |
| 2005/0162727 A1 | 7/2005 | Ishii et al. |

(Continued)

FOREIGN PATENT DOCUMENTS

JP   2004-361822 A   * 12/2004

(Continued)

OTHER PUBLICATIONS

International Search Report (PCT/ISA/210) prepared for PCT/IB2007/003745 on Jun. 24, 2008 (published in WO 2008/050238 A3).*

*Primary Examiner*—David N Spector
(74) *Attorney, Agent, or Firm*—Bo-In Lin

(57) ABSTRACT

Additional control flexibilities to generate more gray scales for an image display system is achieved by controlling the intensity distribution of the light projection from a light source to a deflecting mirror to further coordinate with the control of the intermediate states of the deflecting mirror. The control light source intensity distribution can provide incident light with wide varieties of intensity distributions including non-uniform, symmetrical and non-symmetrical, different distributions of polarizations, various cross sectional shapes of the incident lights and other combinations of all of the above variations. More stable and better control of gray scale control is also achieved by optimizing the intensity distributions of the incident light to produce the best visual effects of the image display.

36 Claims, 25 Drawing Sheets

U.S. PATENT DOCUMENTS

2005/0206992 A1 9/2005 Ishii
2005/0254116 A1 11/2005 Ishii
2006/0285191 A1 12/2006 Yang
2008/0007576 A1* 1/2008 Ishii et al. .................. 345/691

FOREIGN PATENT DOCUMENTS

WO    WO 2008/050238 A2 *  5/2008

* cited by examiner

Fig. 1A (Prior Art)
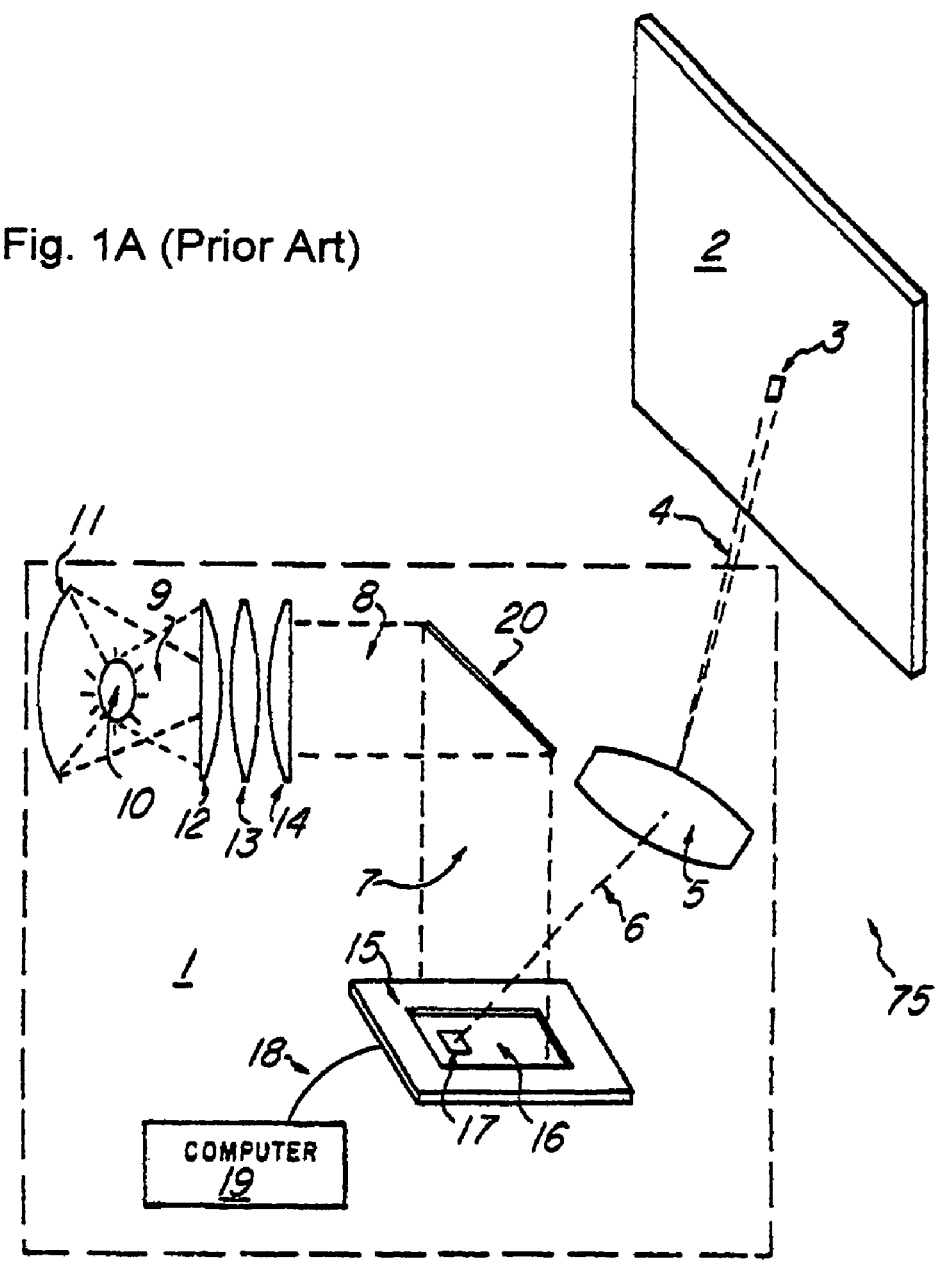
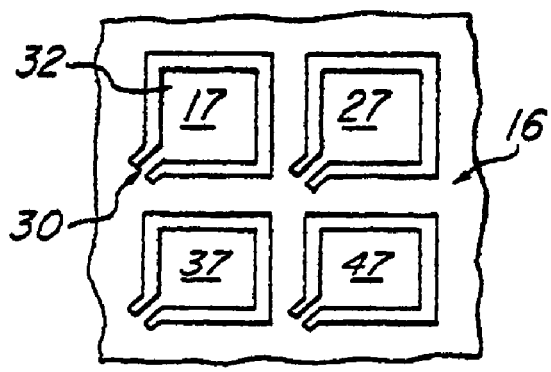
Fig. 1B (Prior Art)

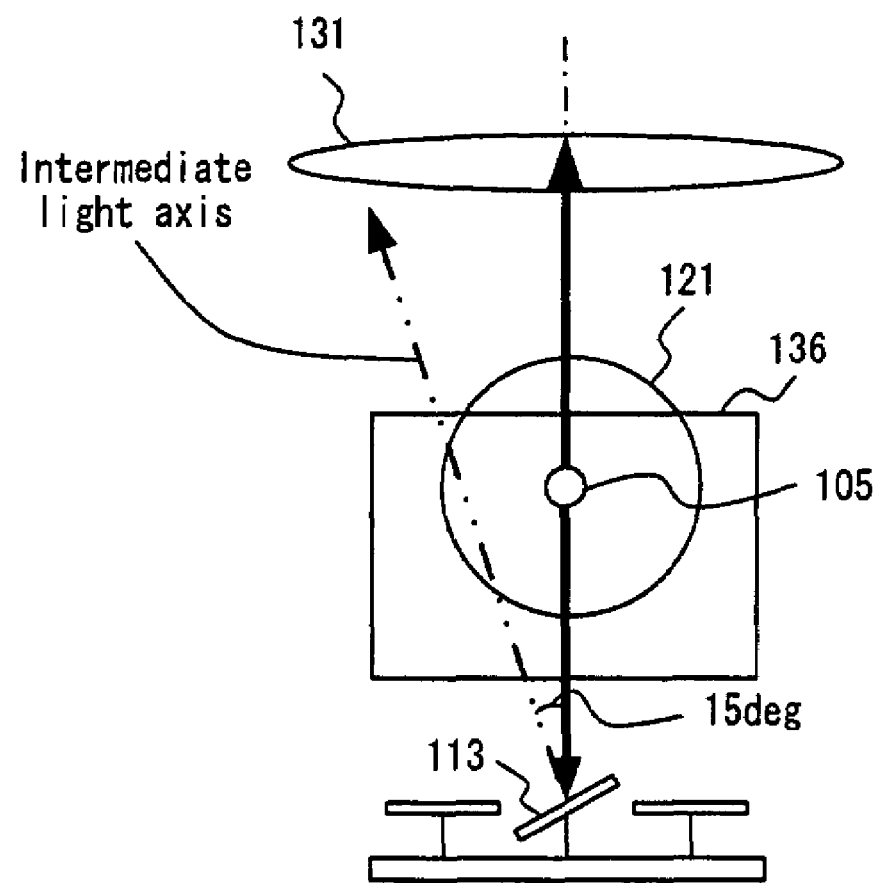
F I G. 5 D

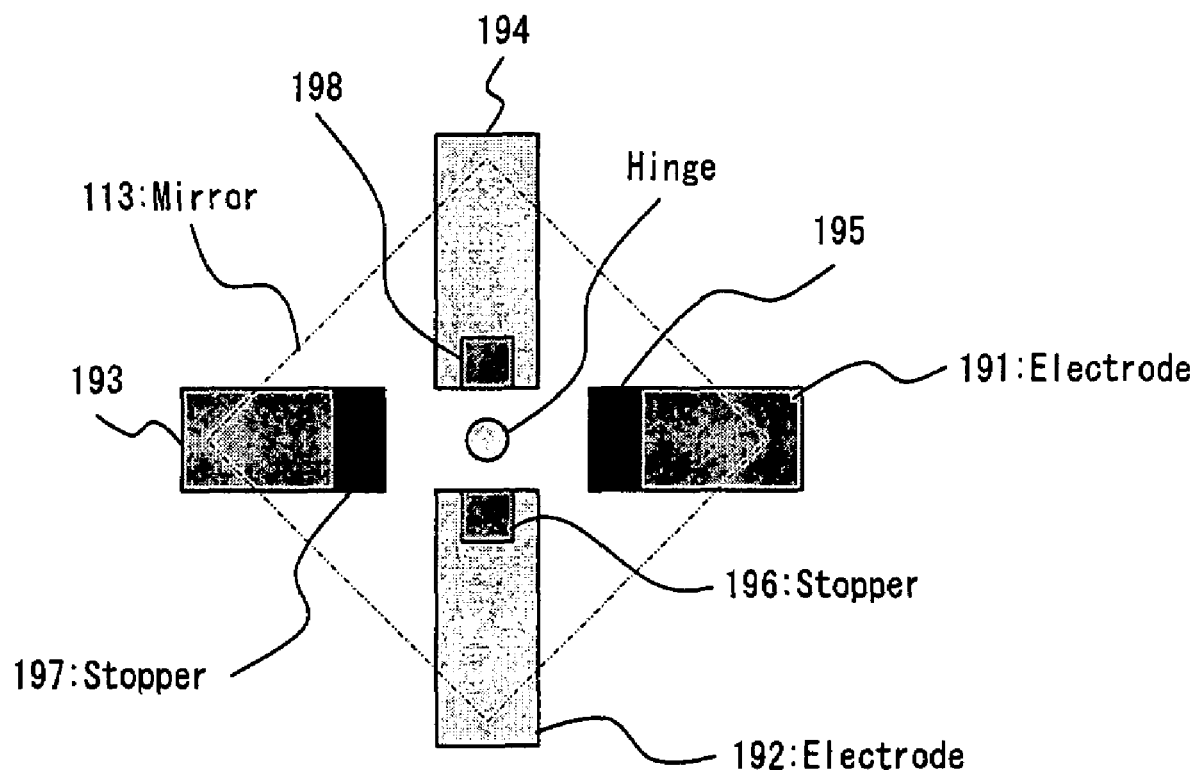
F I G. 1 2

US 7,573,633 B2

INCREASE GRAY SCALES OF PROJECTION SYSTEM BY REFLECTING LIGHT FROM MIRROR ELEMENTS WITH NON-UNIFORM INTENSITY DISTRIBUTION

This application is a Non-provisional Application of a Provisional Application 60/816,452 filed on Jun. 26, 2006. This Application is a Continuation in Part (CIP) Application of a U.S. patent applications Ser. No. 11/121,543 filed on May 4, 2005. The application Ser. No. 11/121,543 is a Continuation in part (CIP) Application of three previously filed Applications. These three Applications are Ser. No 10/698,620 filed on Nov. 1, 2003, Ser. No. 10/699,140 filed on Nov. 1, 2003, and Ser. No. 10/699,143 filed on Nov. 1, 2003 by one of the Applicants of this Patent Application. The disclosures made in these Patent Applications are hereby incorporated by reference in this Patent Application.

BACKGROUND OF THE INVENTION

1. Field of the Invention

This invention relates to image display system. More particularly, this invention relates to display system with light source for projecting controllable non-symmetrical and non-uniform intensity distribution of incident light flux for controlling gray scales of image display.

2. Relevant Art

Even though there are significant advances made in recent years on the technologies of implementing electromechanical micromirror devices as spatial light modulator, there are still limitations and difficulties when employed to provide high quality images display. Specifically, when the display images are digitally controlled, the image qualities are adversely affected due to the fact that the image is not displayed with sufficient number of gray scales.

Electromechanical micromirror devices have drawn considerable interest because of their application as spatial light modulators (SLMs). A spatial light modulator requires an array of a relatively large number of micromirror devices. In general, the number of devices required ranges from 60,000 to several million for each SLM. Referring to FIG. 1A for a digital video system 1 disclosed in a relevant U.S. Pat. No. 5,214,420 that includes a display screen 2. A light source 10 is used to generate light energy for ultimate illumination of display screen 2. Light 9 generated is further concentrated and directed toward lens 12 by mirror 11. Lens 12, 13 and 14 form a beam columnator to operative to columnate light 9 into a column of light 8. A spatial light modulator 15 is controlled by a computer 19 through data transmitted over data cable 18 to selectively redirect a portion of the light from path 7 toward lens 5 to display on screen 2. The SLM 15 has a surface 16 that includes an array of switchable reflective elements, e.g., micromirror devices 32, such as elements 17, 27, 37, and 47 as reflective elements attached to a hinge 30 that shown in FIG. 1B. When element 17 is in one position, a portion of the light from path 7 is redirected along path 6 to lens 5 where it is enlarged or spread along path 4 to impinge the display screen 2 so as to form an illuminated pixel 3. When element 17 is in another position, light is not redirected toward display screen 2 and hence pixel 3 would be dark.

The on-and-off states of micromirror control scheme as that implemented in the U.S. Pat. No. 5,214,420 and by most of the conventional display system imposes a limitation on the quality of the display. Specifically, when applying conventional configuration of control circuit has a limitation that the gray scale of conventional system (PWM between ON and OFF states) is limited by the LSB (least significant bit, or the least pulse width). Due to the On-Off states implemented in the conventional systems, there is no way to provide shorter pulse width than LSB. The least brightness, which determines gray scale, is the light reflected during the least pulse width. The limited gray scales lead to degradations of image display.

Specifically, in FIG. 1C an exemplary circuit diagram of a prior art control circuit for a micromirror according to U.S. Pat. No. 5,285,407. The control circuit includes memory cell 32. Various transistors are referred to as "M*" where * designates a transistor number and each transistor is an insulated gate field effect transistor. Transistors M5, and M7 are p-channel transistors; transistors, M6, M8, and M9 are n-channel transistors. The capacitances, C1 and C2, represent the capacitive loads presented to memory cell 32. Memory cell 32 includes an access switch transistor M9 and a latch 32a, which is the basis of the static random access switch memory (SRAM) design. All access transistors M9 in a row receive a DATA signal from a different bit-line 31a. The particular memory cell 32 to be written is accessed by turning on the appropriate row select transistor M9, using the ROW signal functioning as a wordline. Latch 32a is formed from two cross-coupled inverters, M5/M6 and M7/M8, which permit two stable states. state 1 is Node A high and Node B low and state 2 is Node A low and Node B high.

The dual states switching as illustrated by the control circuit controls the micromirrors to position either at an ON of an OFF angular orientation as that shown in FIG. 1A. The brightness, i.e., the gray scales of display for a digitally control image system is determined by the length of time the micromirror stays at an ON position. The length of time a micromirror is controlled at an ON position is in turned controlled by a multiple bit word. For simplicity of illustration, FIG. 1D shows the "binary time intervals" when control by a four-bit word. As that shown in FIG. 1D, the time durations have relative values of 1, 2, 4, 8 that in turn define the relative brightness for each of the four bits where 1 is for the least significant bit and 8 is for the most significant bit. According to the control mechanism as shown, the minimum controllable differences between gray scales for showing different brightness is a brightness represented by a "least significant bit" that maintaining the micromirror at an ON position.

When adjacent image pixels are shown with great degree of different gray scales due to a very coarse scale of controllable gray scale, artifacts are shown between these adjacent image pixels. That leads to image degradations. The image degradations are specially pronounced in bright areas of display when there are "bigger gaps" of gray scales between adjacent image pixels. It was observed in an image of a female model that there were artifacts shown on the forehead, the sides of the nose and the upper arm. The artifacts are generated due to a technical limitation that the digital controlled display does not provide sufficient gray scales. At the bright spots of display, e.g., the forehead, the sides of the nose and the upper arm, the adjacent pixels are displayed with visible gaps of light intensities.

As the micromirrors are controlled to have a fully on and fully off position, the light intensity is determined by the length of time the micromirror is at the fully on position. In order to increase the number of gray scales of display, the speed of the micromirror must be increased such that the digital control signals can be increased to a higher number of bits. However, when the speed of the micromirrors is increased, a strong hinge is necessary for the micromirror to sustain a required number of operational cycles for a designated lifetime of operation, In order to drive the micromirrors supported on a further strengthened hinge, a higher voltage is required. The higher voltage may exceed twenty volts and may even be as high as thirty volts. The micromirrors manufacture by applying the CMOS technologies probably would not be suitable for operation at such higher range of voltages and therefore the DMOS micromirror devices may be required. In order to achieve higher degree of gray scale control, a more complicate manufacturing process and larger device areas are necessary when DMOS micromirror is implemented. Conventional modes of micromirror control are therefore facing a technical challenge that the gray scale accuracy has to be sacrificed for the benefits of smaller and more cost effective micromirror display due to the operational voltage limitations.

There are many patents related to light intensity control. These patents include U.S. Pat. Nos. 5,589,852, 6,232,963, 6,592,227, 6,648,476, and 6,819,064. There are further patents and patent applications related to different shapes of light sources. These patents includes U.S. Pat. Nos. 5,442,414, 6,036,318 and Application 20030147052. The U.S. Pat. No. 6,746,123 discloses special polarized light sources for preventing light loss. However, these patents and patent application do not provide an effective solution to overcome the limitations caused by insufficient gray scales in the digitally controlled image display systems.

Furthermore, there are many patents related to spatial light modulation that includes U.S. Pat. Nos. 2,025,143, 2,682,010, 2,681,423, 4,087,810, 4,292,732, 4,405,209, 4,454,541, 4,592,628, 4,615,595, 4,728,185, 4,767,192, 4,842,396, 4,907,862, 5,214,420, 5,287,096, 5,506,597, 5,489,952, 6,064,366, 6,535,319, and 6,880,936. However, these inventions have not addressed and provided direct resolutions for a person of ordinary skill in the art to overcome the above-discussed limitations and difficulties.

Therefore, a need still exists in the art of image display systems applying digital control of a micromirror array as a spatial light modulator to provide new and improved systems such that the above-discussed difficulties can be resolved.

SUMMARY OF THE INVENTION

One aspect of the present invention relates to the control of a light source to project an incident light with a predefined unsymmetrical distribution of light intensity in the incident light flux. The purpose of controlling the intensity with unsymmetrical distribution of the incident light is to apply such distribution in coordination with the spatial light modulators (SLMs) that has intermediate state control for providing more flexibly controllable gray scales of display. The control and generation of display of additional gray scales are achieved without requiring a higher speed of micromirror oscillation thus maintaining a low operational voltage.

In another aspect, the present invention provides a projection system with new and improved display with increased gray scale by controlling the input light source to provide controllable intensity distribution or controllable variation of projection shapes of the incident light flux. The non-uniformity and the unsymmetrical light intensity and shapes of the incident light cross sections are projected onto the pupil of the incident light optics before projecting onto the mirror surface of the SLM. With an incident light that has a non-uniform intensity distribution when projecting onto the SLM, additional gray scales can be generated because the projected image on a screen is not an uniform image.

In yet another aspect, the present invention provides a projection system by projecting a non-uniform and non-symmetrical incident light that has variety of shapes of incident light cross section at the pupil along an optical path. By more precisely controlling the intensity distribution or the cross section shapes of the incident light, the gray scale for display is now controllable to project finer scale of brightness differences between adjacent pixels with an additional controllable state to provide a fraction of brightness of the fully-on state for display. The annoying artifacts shown on a display caused by adjacent pixels having huge gray scale gaps can be significantly reduced.

In yet another aspect, the present invention provides a method of controlling the shapes and the intensity distribution of the incident light by providing intermediate states not only between the ON and OFF states but also other directions. The system can establish variety of intermediate areas in different diffraction areas. Furthermore, the method includes a step of coordinating the color filters or color wheels and intensity distribution of the incident light with an array of micromirror devices. Optionally, the micromirrors are enabled to oscillate in a reverse direction or stop before the micromirror completes a full oscillation cycle. Aided by such control flexibility and the fractional brightness for image display during an intermediate oscillation state, additional flexibilities are now provided to fine tune the gray scale for each image pixel especially for the high brightness display area where a gray scale difference are proportionally amplified due to the high intensity of light projections.

It is another aspect of this invention that the invention enables the use of various intermediate gray scale and high-level gray scale by changing the direction of deflection of SLM depending on systems.

It is another aspect of this invention that the contrast is improved by minimizing the light flux at OFF time to achieve high gray scale. If the deflection angle close to OFF is used, the contrast is worsened and high gray scale cannot be obtained. This invention solves these problems and is the intermediate gray scale generating apparatus utilizing light modulation to achieve high gray scale.

These and other objects and advantages of the present invention will no doubt become obvious to those of ordinary skill in the art after having read the following detailed description of the preferred embodiment, which is illustrated in the various drawing figures.

BRIEF DESCRIPTIONS OF THE DRAWINGS

The present invention is described in detail below with reference to the following Figures.

FIGS. 1A and 1B are functional block diagram and a top view of a portion of a micromirror array implemented as a spatial light modulator for a digital video display system of a conventional display system disclosed in a prior art patent.

Figure 3:
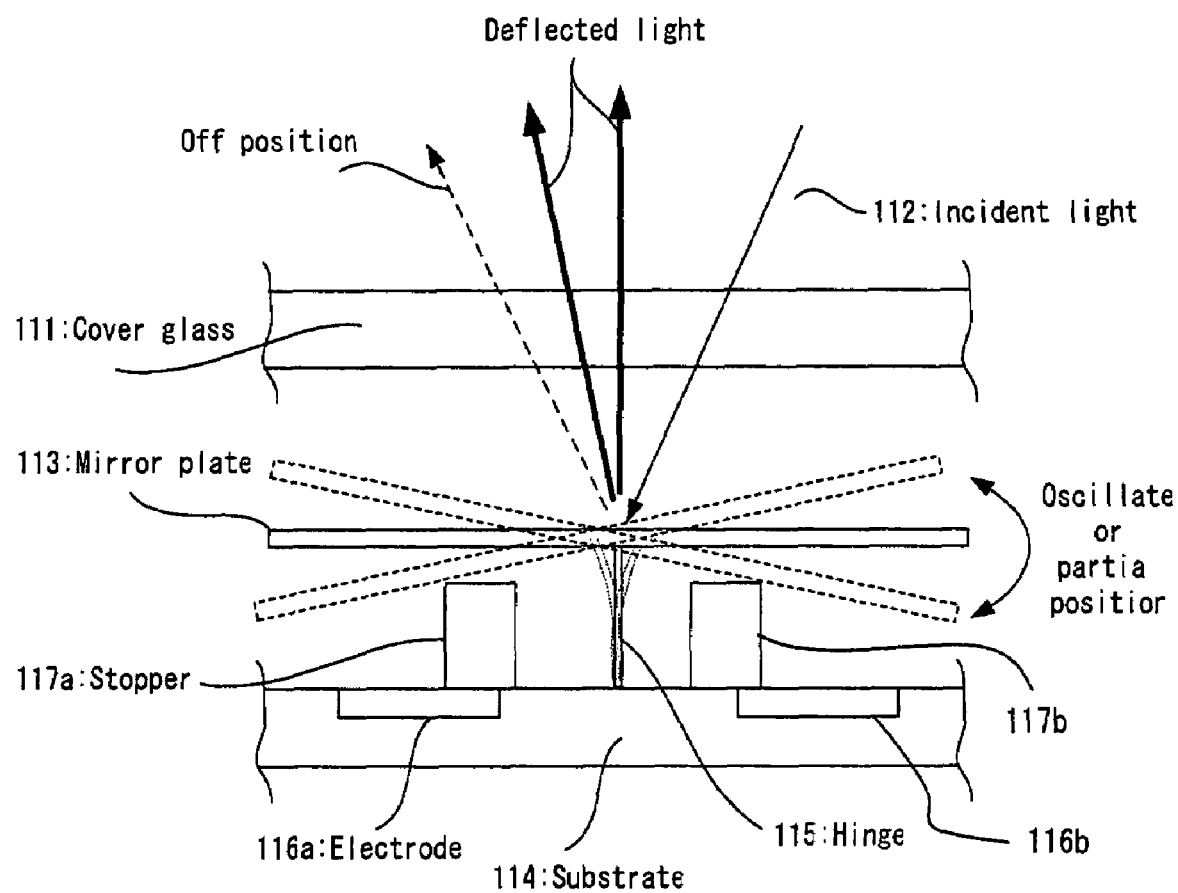

FIG. 3 diagrammatically shows the cross section of one of deflectable spatial light modulators in an SLM.

Figure 4A:
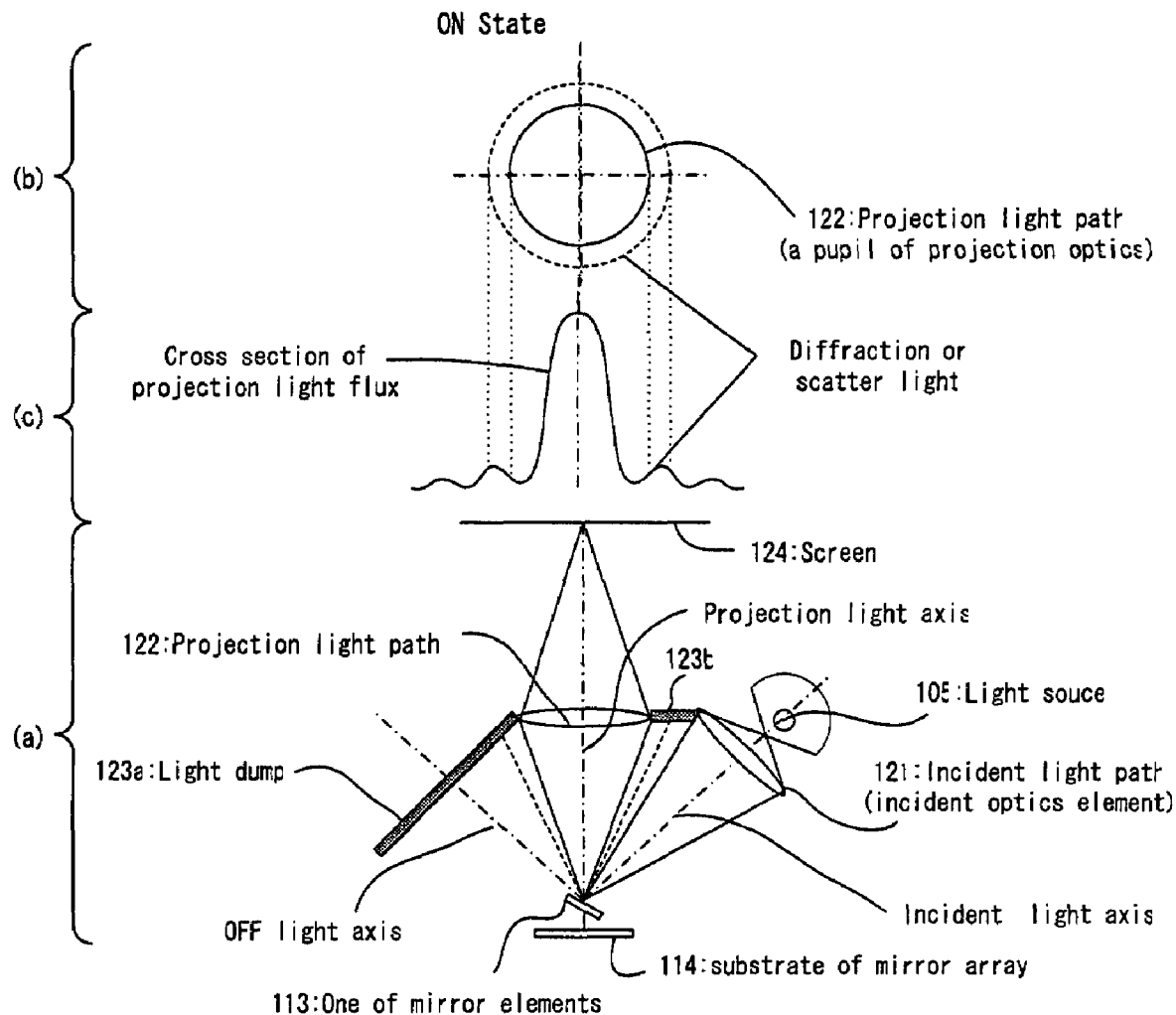
Figure 4B:
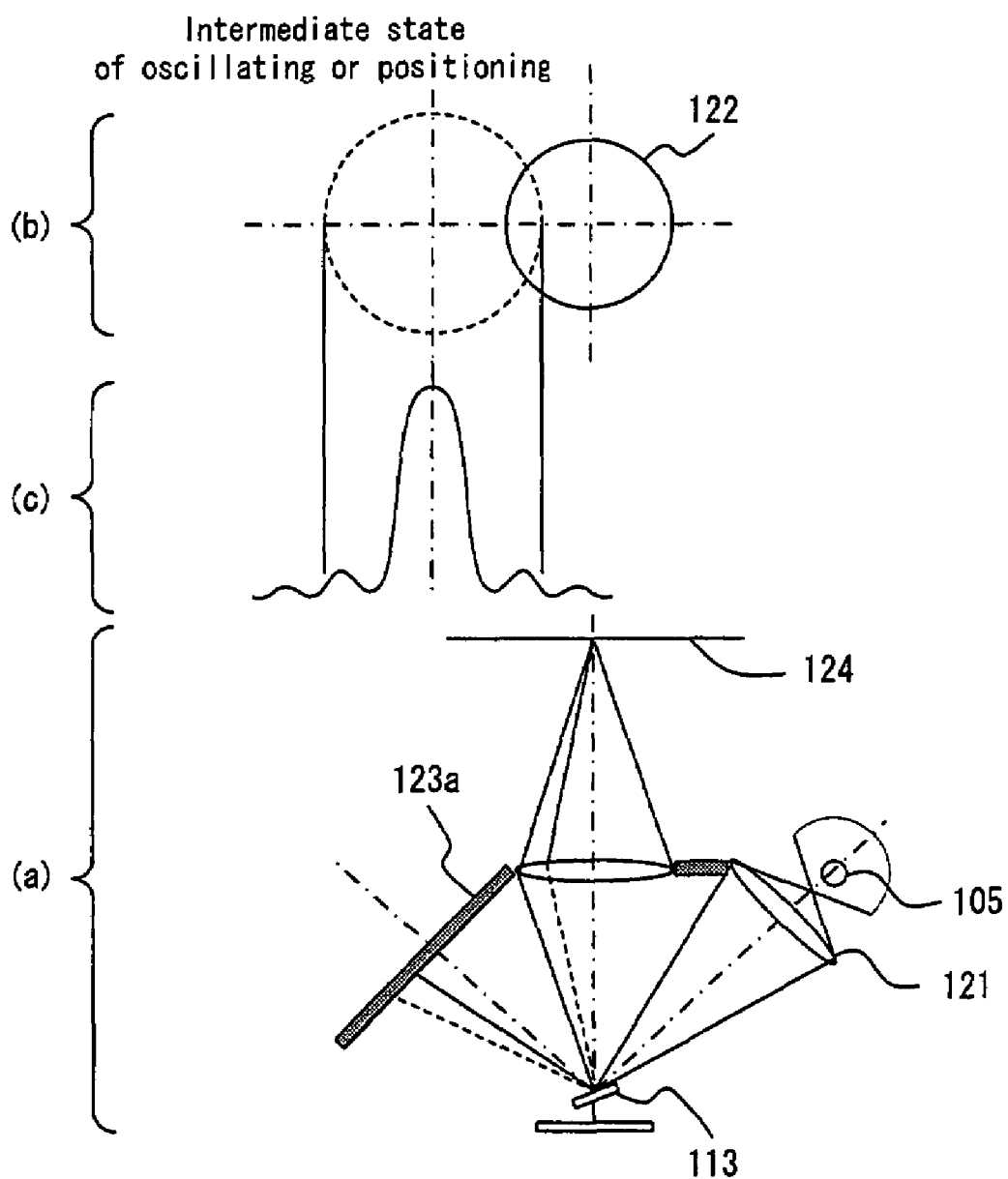
Figure 4C:
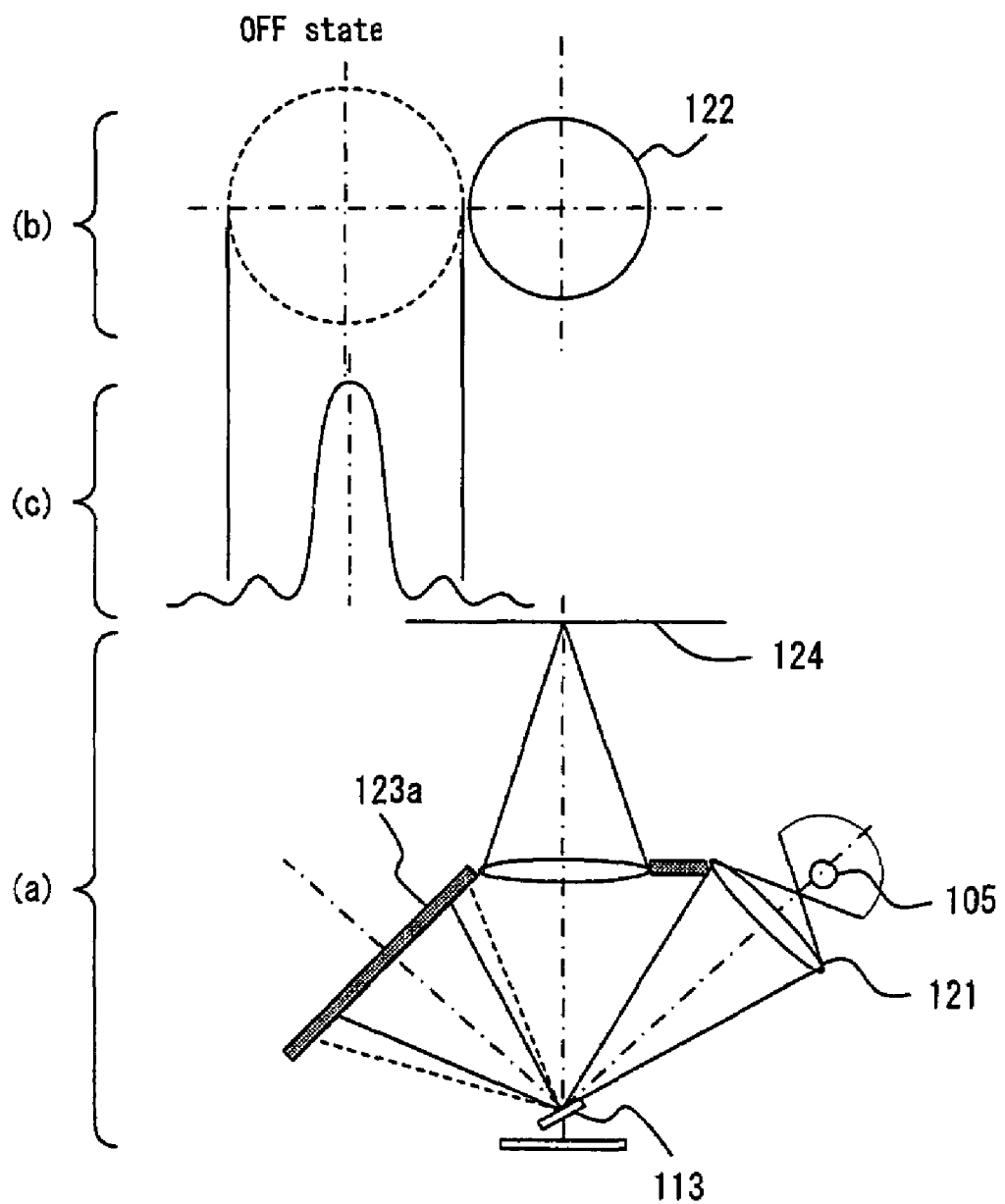

FIGS. 4A to 4C explain the ON state, Intermediate state, and OFF state in the projection system according to the first embodiment.

FIGS. 5A to 5E explain the Intermediate light in the projection system according to a second embodiment.

Figure 6:
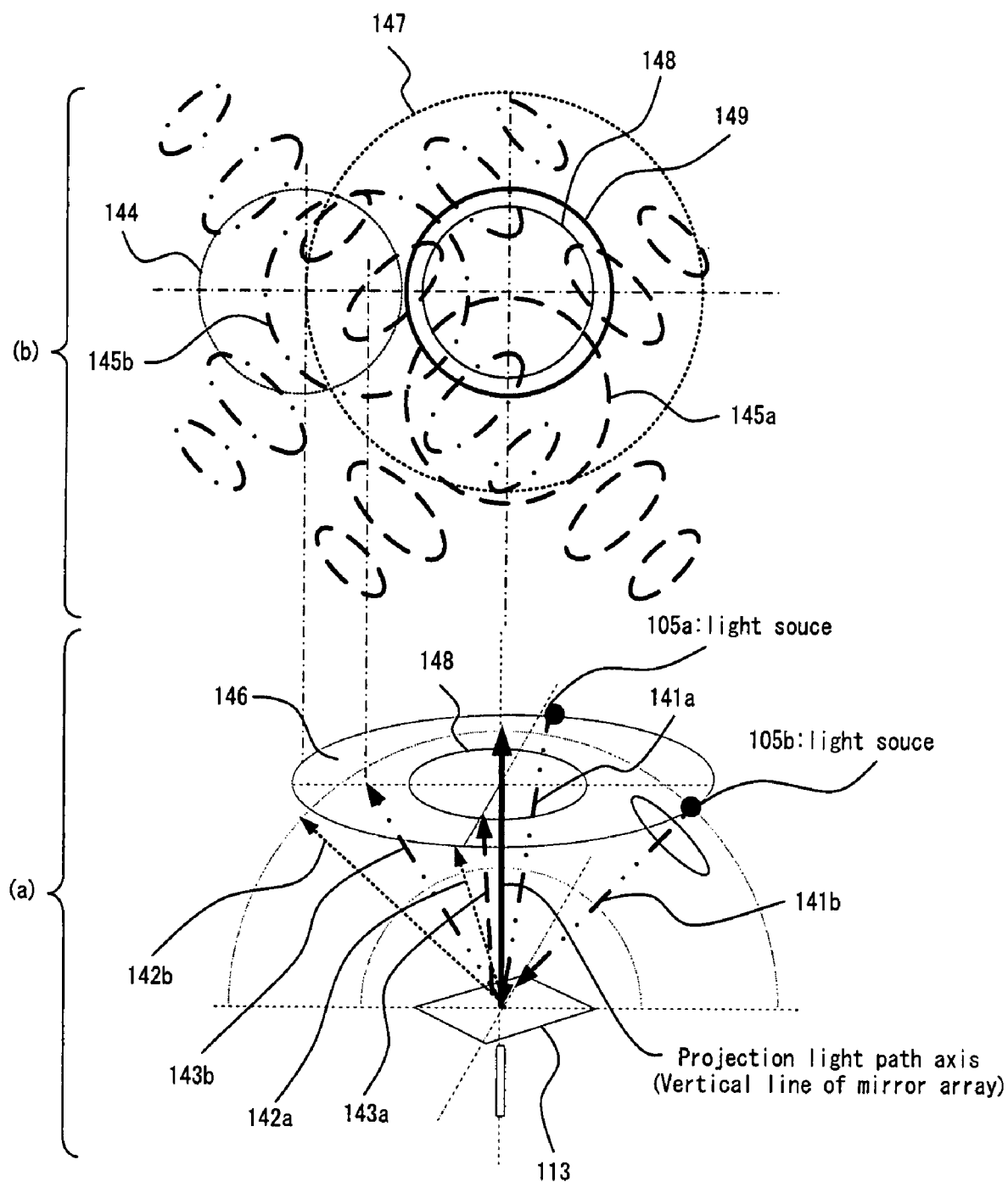

FIG. 6 explains the Intermediate light in the projection system according to a third embodiment.

Figure 7A:
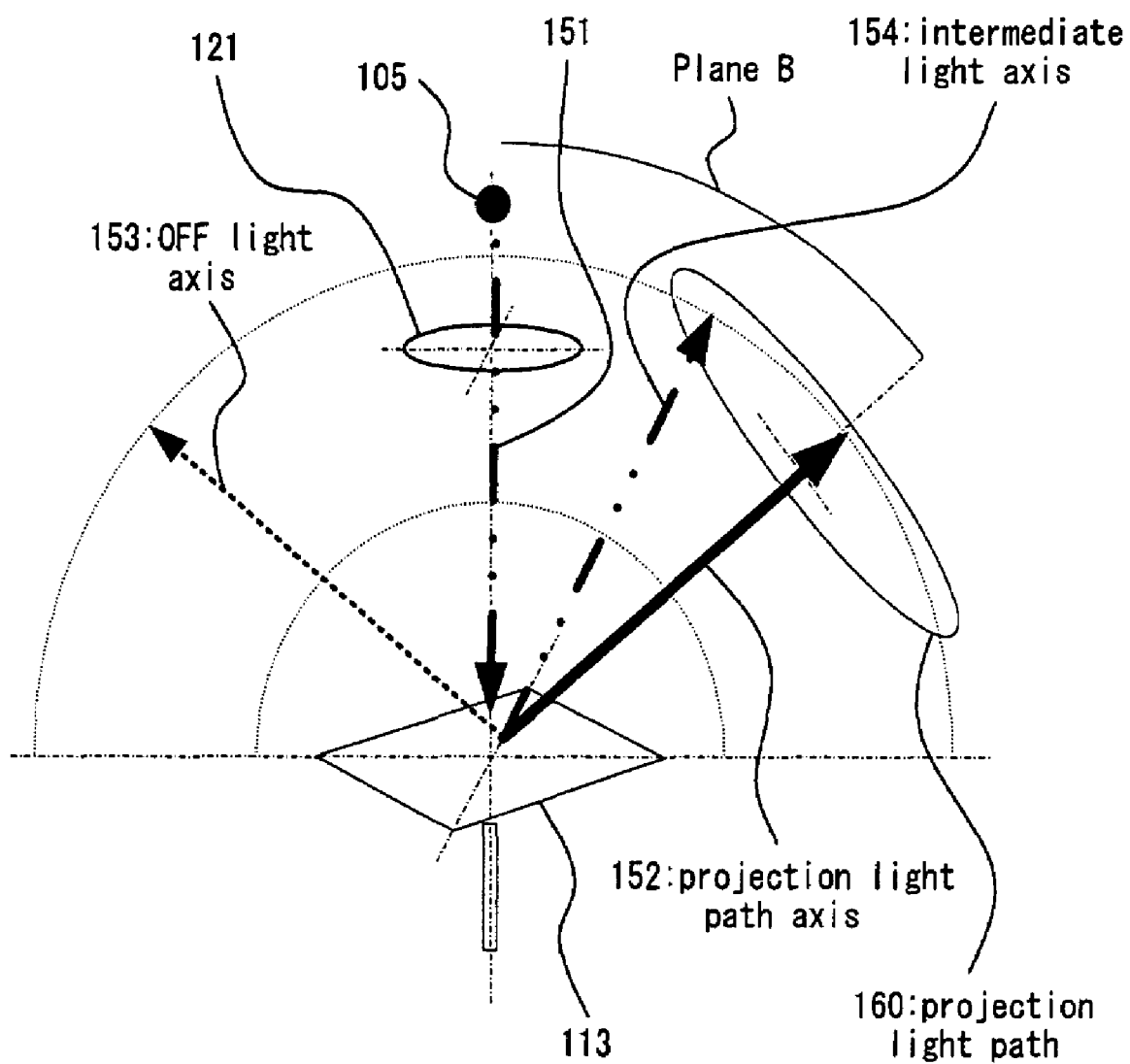
Figure 7B:
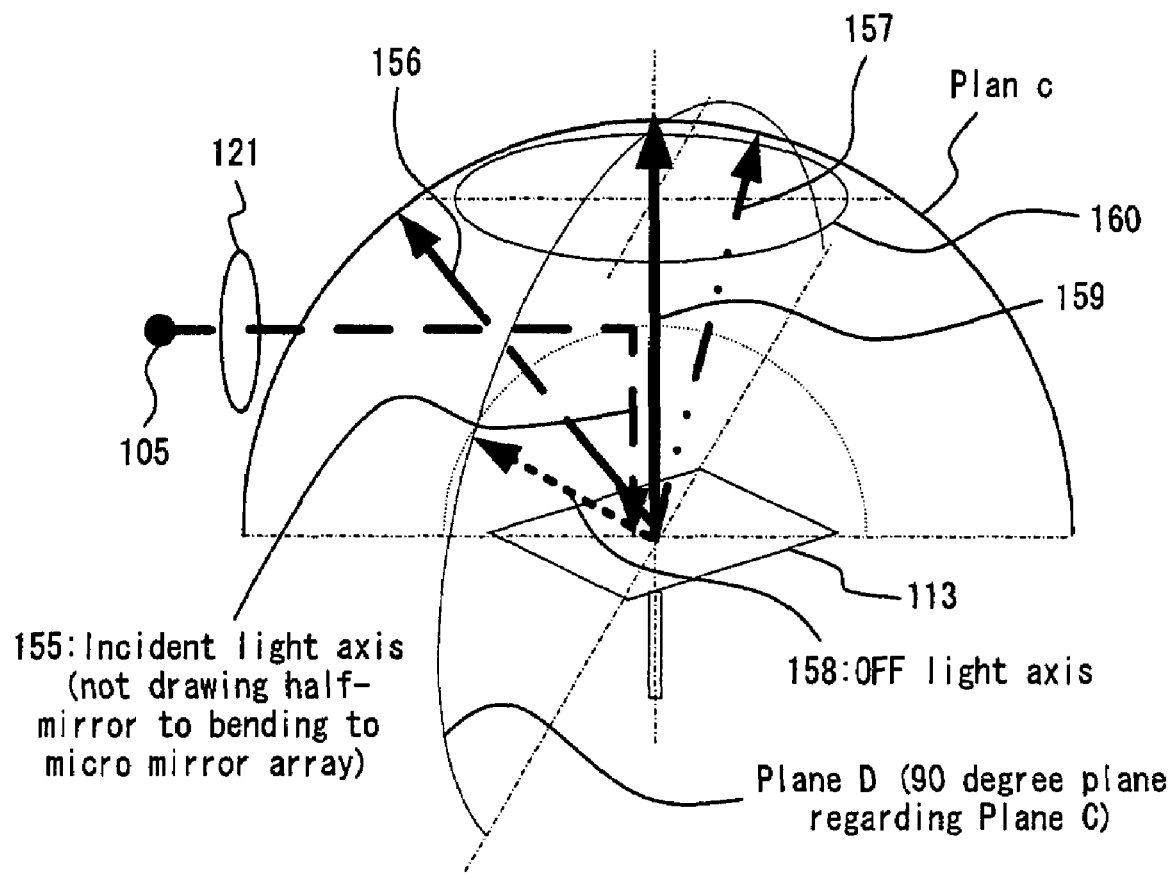

FIGS. 7A to 7B explain the incident light and the OFF light in the projection system according to a fourth embodiment.

Figure 8A:
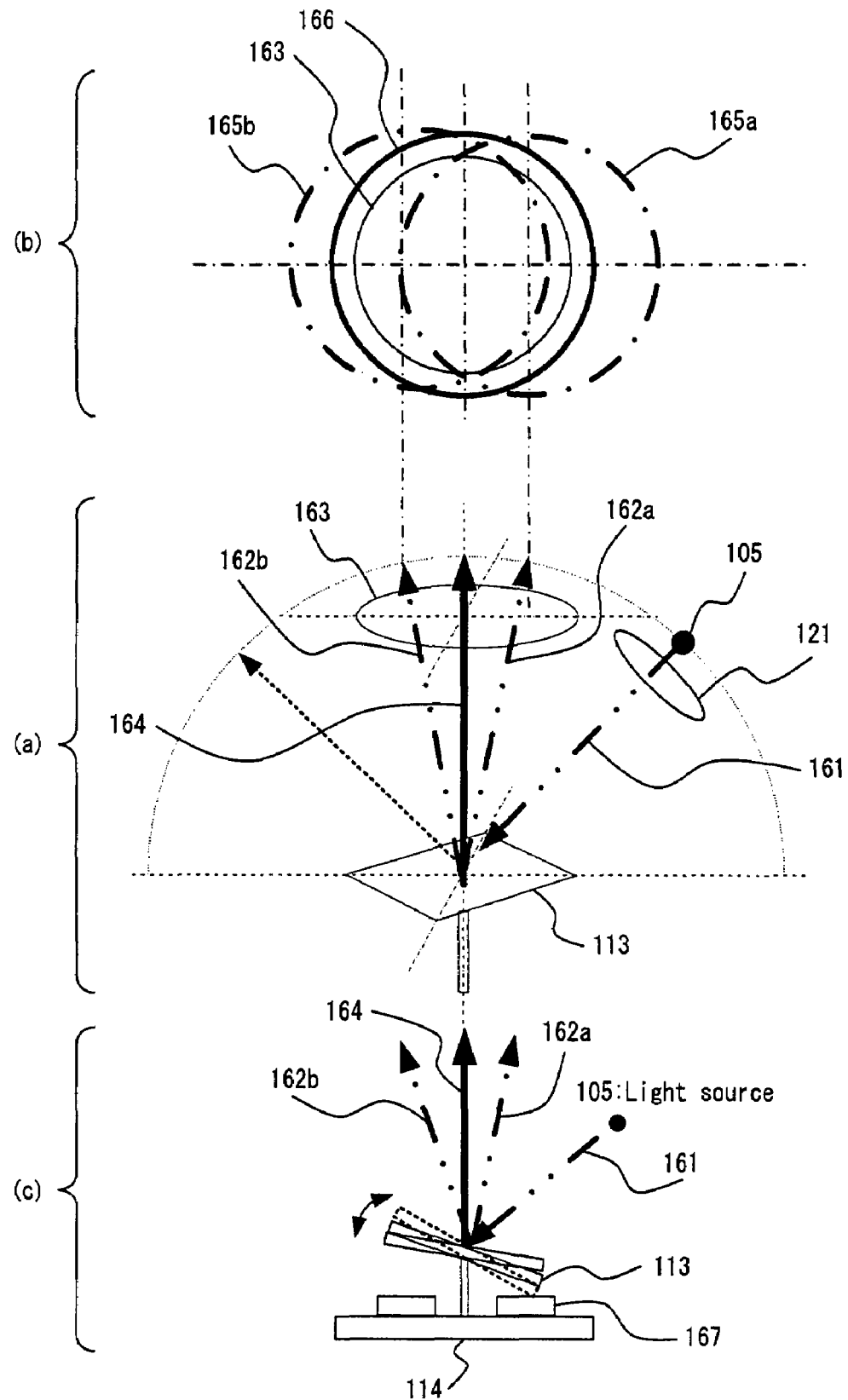
Figure 8B:
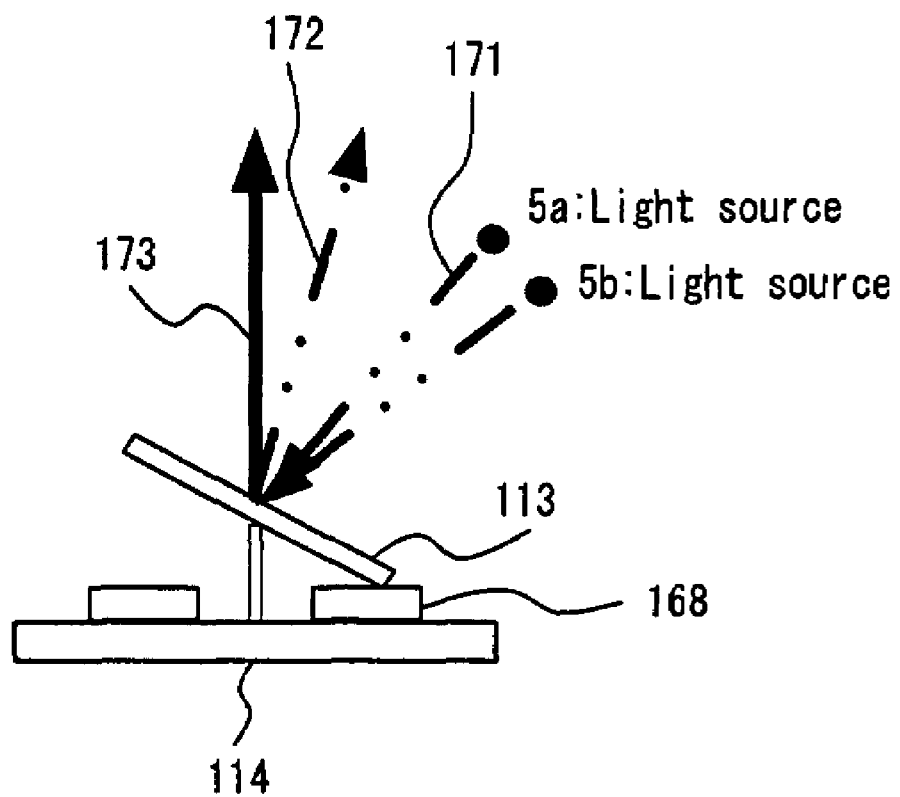

FIGS. 8A to 8B explain the projection light path and the Intermediate light in the projection system according to a fifth embodiment.

Figure 9A:
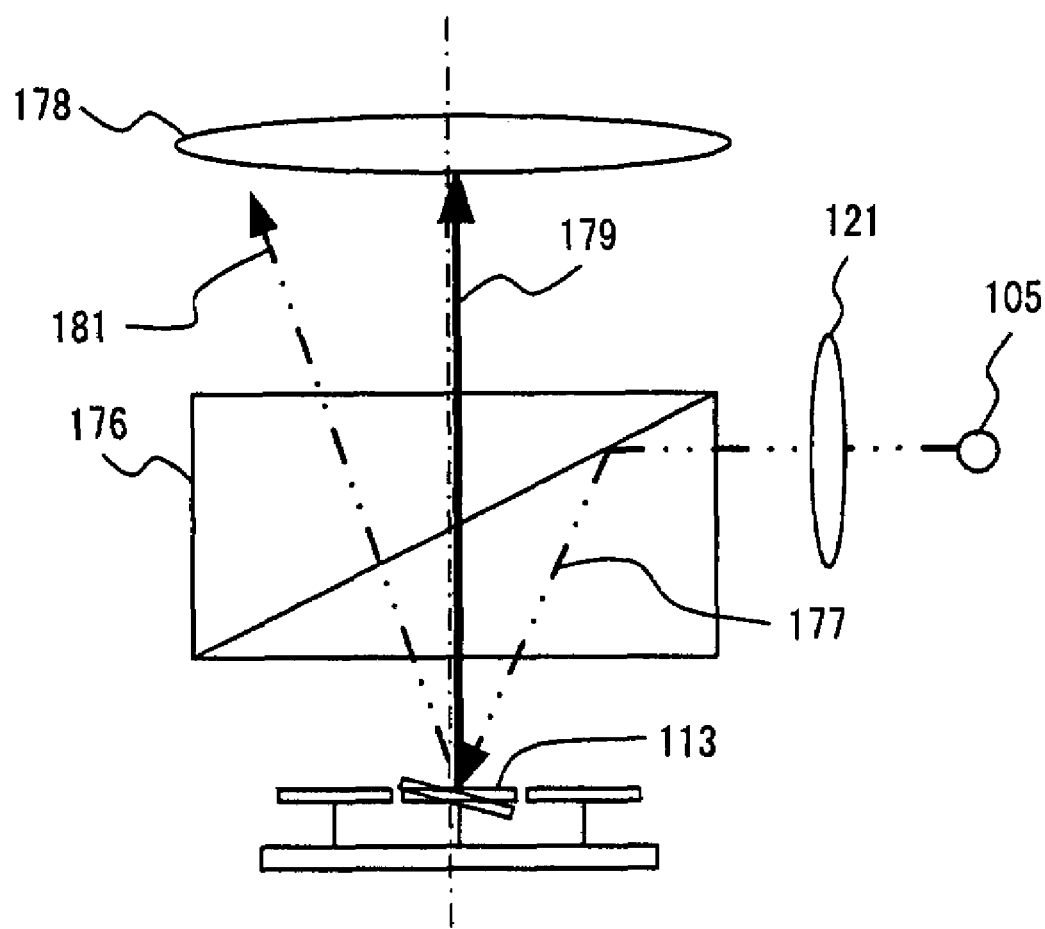
Figure 9B:
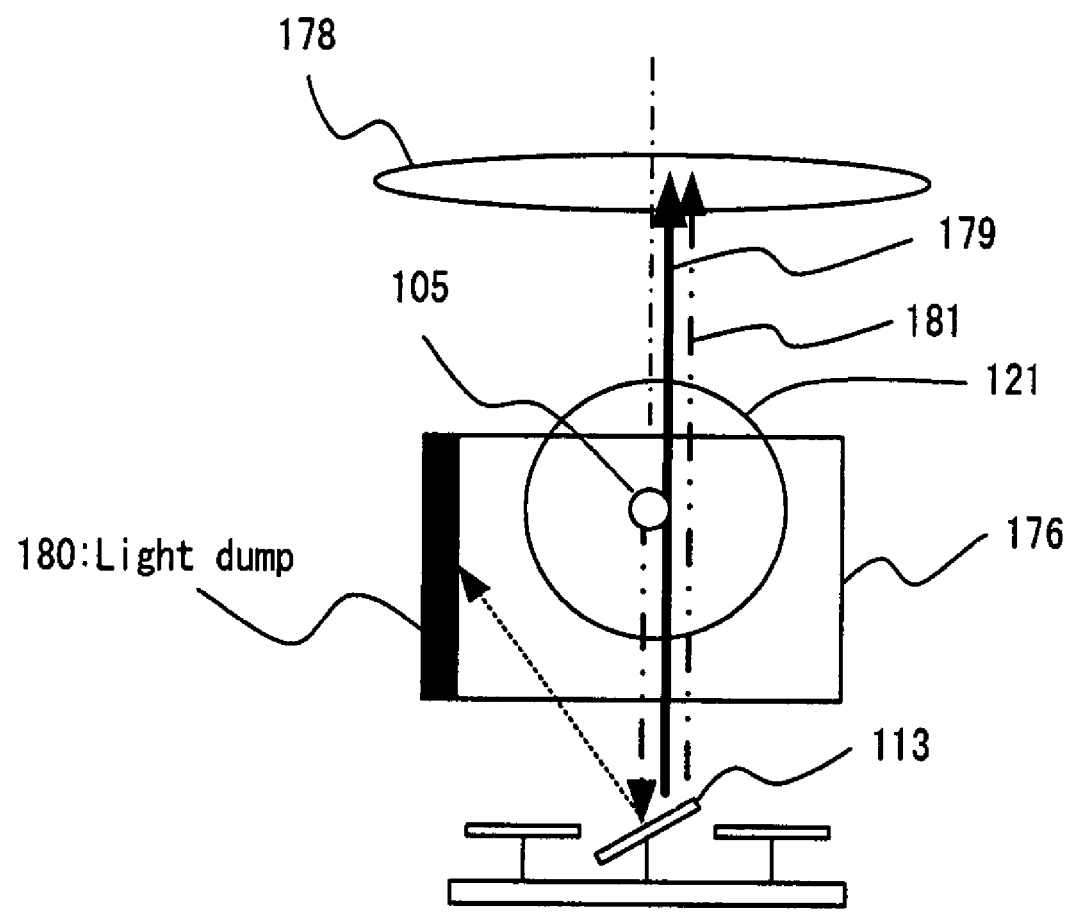

FIGS. 9A and 9B explain a flat surface that absorbs the OFF light in the projection system according to a sixth embodiment.

Figure 10A:
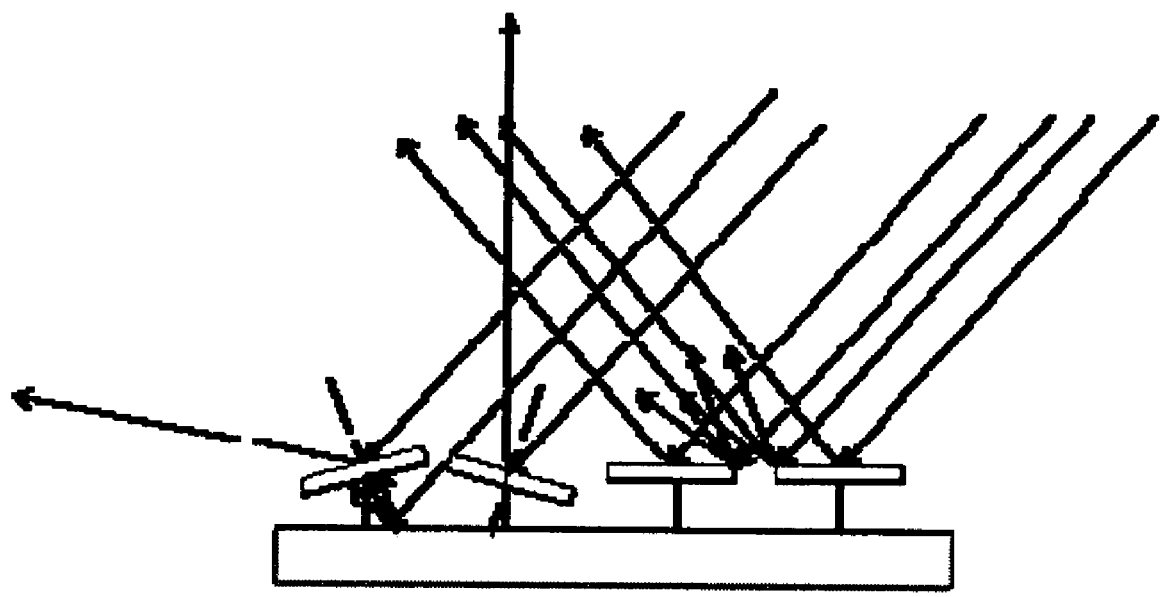

FIG. 10A diagrammatically shows the SLM illuminated with coherent illumination light.

Figure 10B:
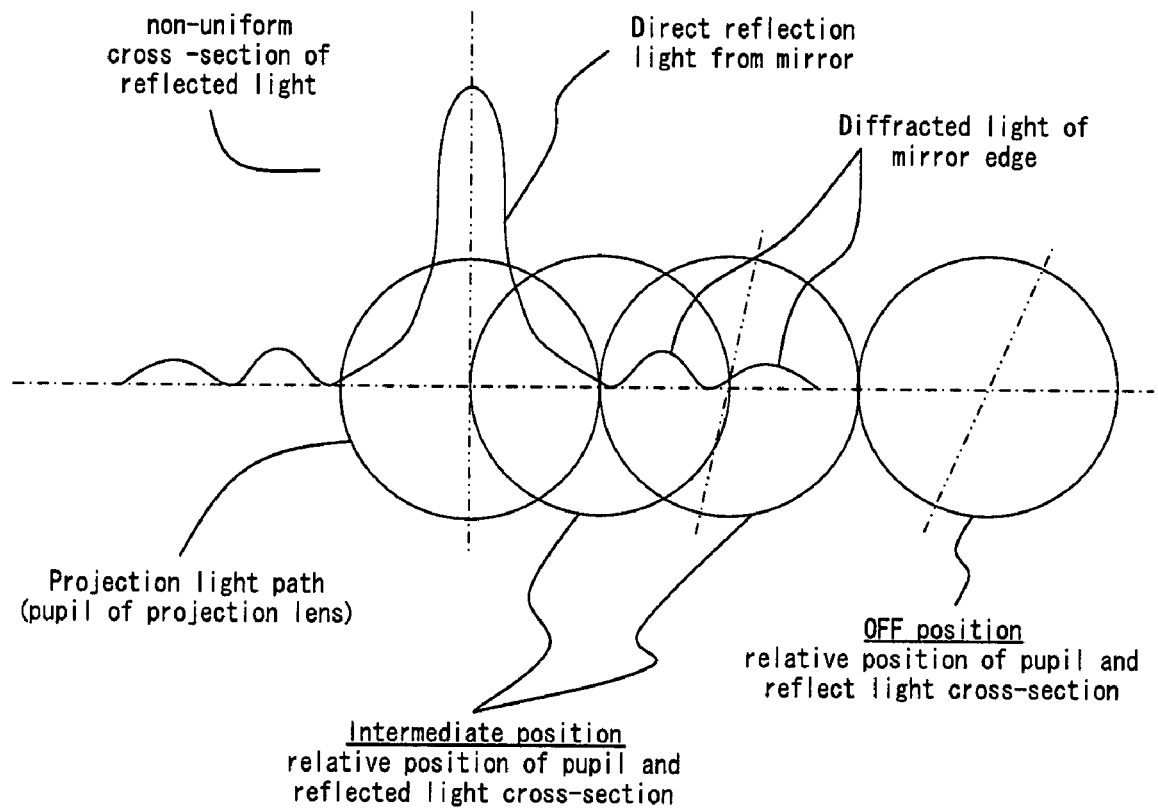

FIG. 10B diagrammatically shows positional relationship of the light intensity distribution across the light flux cross sections of the deflected light at the pupil of the projection optical system in the ON state, Intermediate state, and OFF state with the pupil of the projection optical system.

Figure 11:
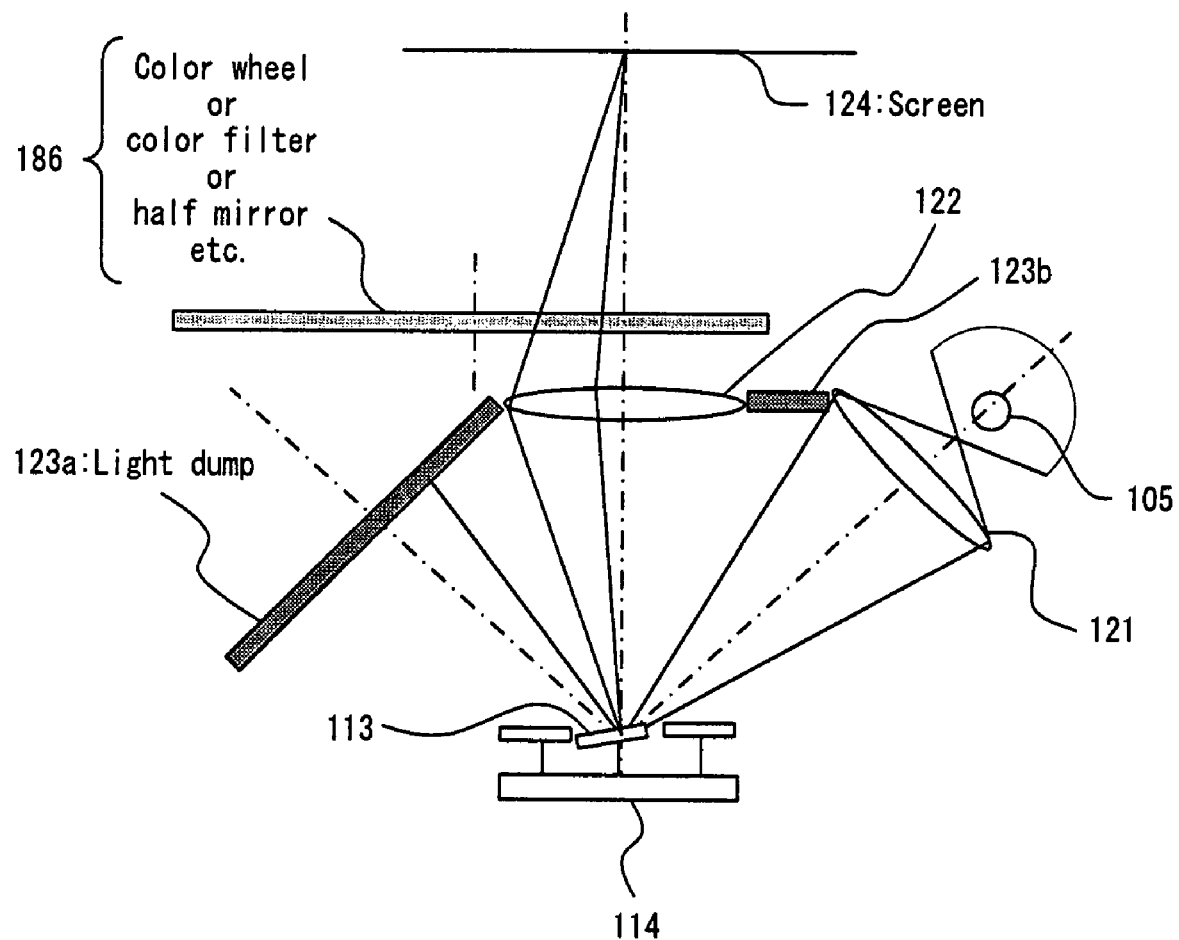

FIG. 11 explains an example in which the projection system includes a light attenuator.

FIG. 12 is a diagrammatic top view of a deflectable spatial light modulating element provided with motion stoppers.

Figure 13:
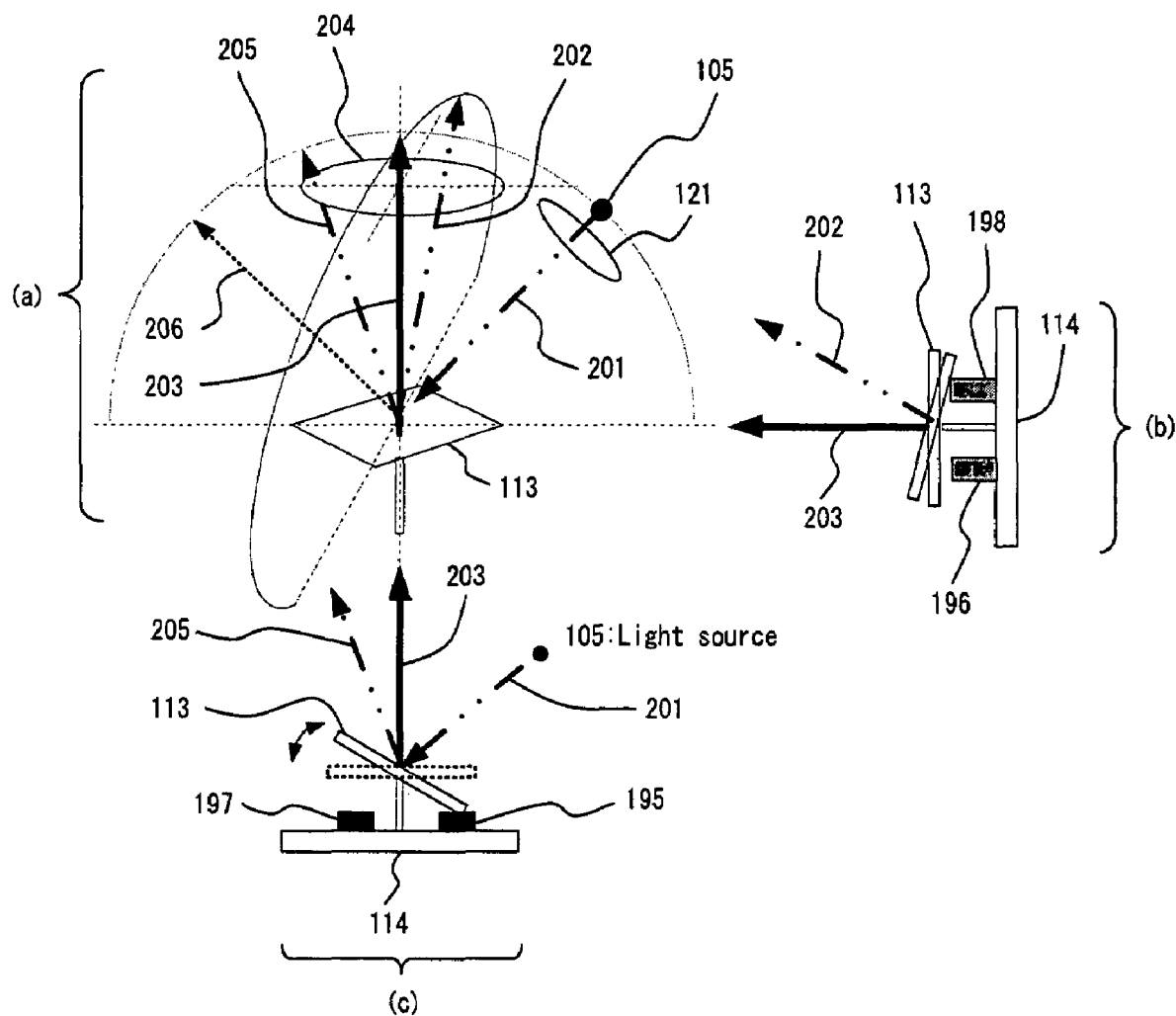

FIG. 13 diagrammatically shows the incident light and the deflected light in the deflectable spatial light modulating element provided with the motion stoppers.

Figure 14:
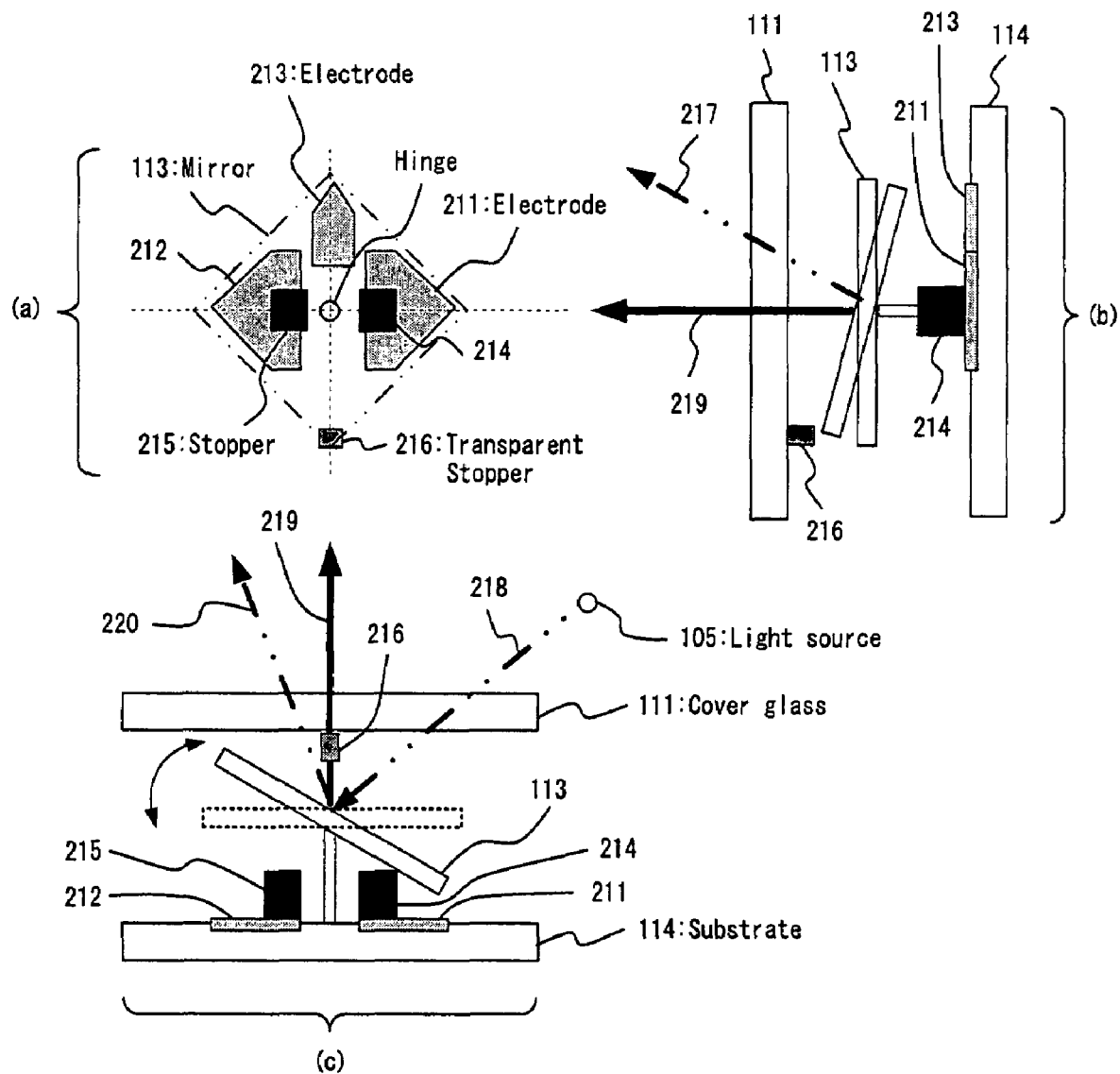

FIG. 14 diagrammatically shows a deflectable spatial light modulating element configured such that the electrode and the motion stopper for the Intermediate state differ from the electrodes and the motion stoppers for the other states (the ON state and the OFF state).

DESCRIPTIONS OF THE PREFERRED EMBODIMENTS

Embodiments of the invention will be described below with reference to the drawings.

First Embodiment

A description will first be made of the basic configuration of the projection system according to a first embodiment of the invention with reference to FIGS. 2 and 3.

Figure 1C:
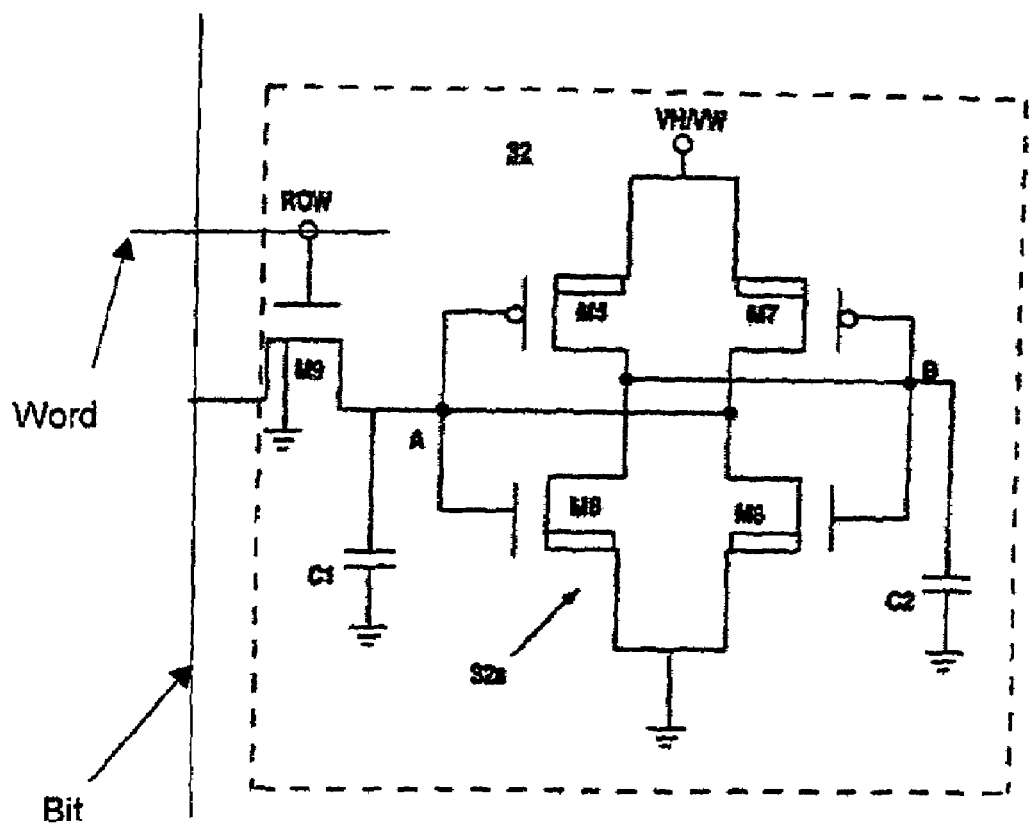
FIG. 1C is a circuit diagram for showing a prior art circuit for controlling a micromirror to position at an ON and OFF states of a spatial light modulator.
Figure 1D:
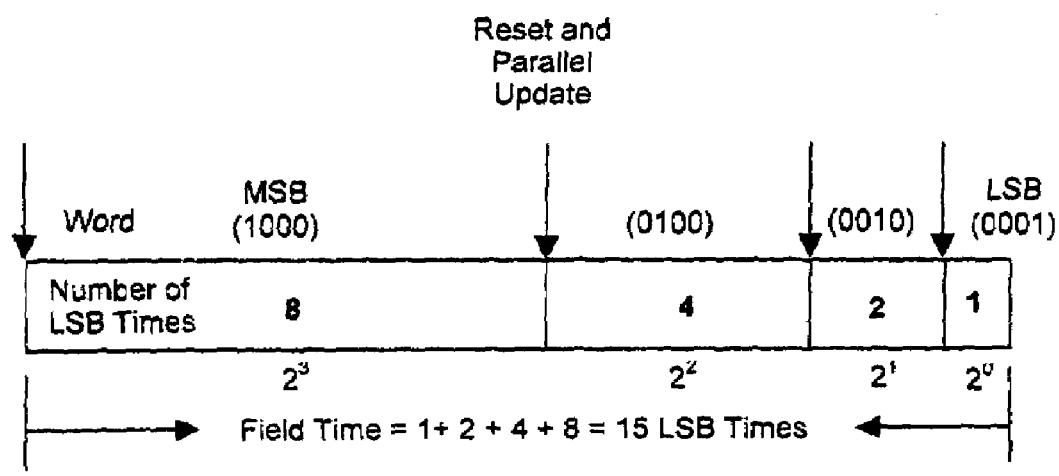
FIG. 1D is diagram for showing the binary time intervals for a four bit gray scale.
Figure 2:
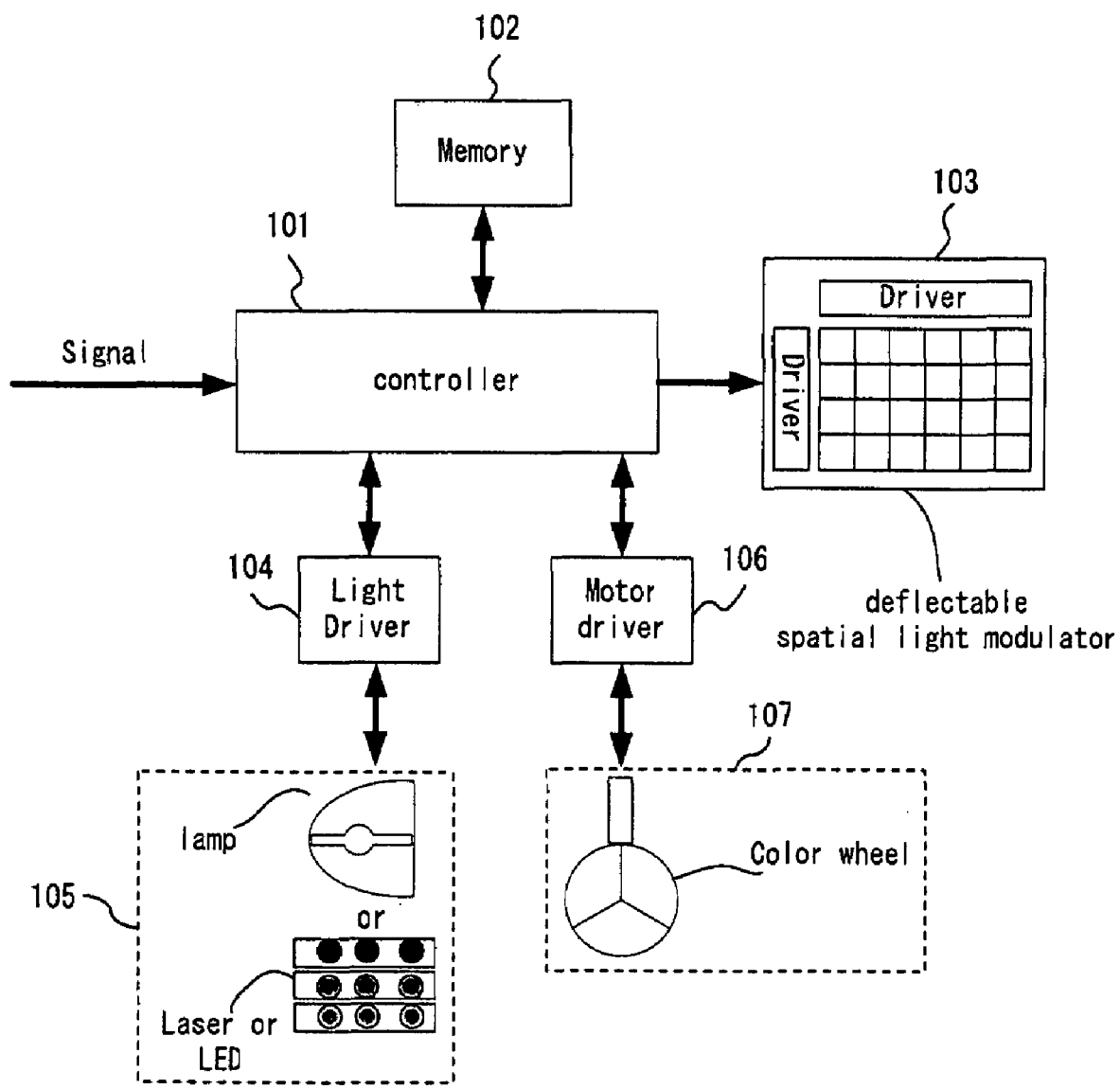
FIG. 2 is a system diagram of the projection system according to a first embodiment.

FIG. 2 is a system diagram of the projection system according to this embodiment. The projection system projects images on a screen or other kinds of display surface (not shown) according to image signals inputted to a controller 101. The controller further accesses data stored in a memory 102 for controlling a deflectable spatial light modulator (hereinafter simply referred to as "SLM") 103. The controller 101 further controls a light driver 104 that receives an incident light from a light source 105. The projection system may further include a motor driver 106 to drive a color wheel included in a filter unit 107 in order to display color images.

The controller 101 controls the SLM 103 and the drivers 104, 106 to project an image according to an input image signal. The memory 102 stores data necessary to control the controller 101. Furthermore, the controller 101 accesses the stored data when required. The SLM 103 has a plurality of deflectable spatial light modulating elements arranged in an array. Each of the deflectable spatial light modulating elements is driven under the control of the controller 101 to deflect light incident on the element. The plurality of deflectable spatial light modulating elements are arranged in an array is also referred to as a mirror array. The light driver 104 drives the light source 105 under the control of the controller 101. Exemplary embodiments of the light source 105 may include lamp-based light sources, such as a high-pressure mercury lamp and a Xenon lamp, semiconductor laser-based light sources, and LED-based light sources. When a laser light source is used as the light source 105, the laser light source includes a plurality of laser light sources arranged as a laser source array. In this case, an exemplary embodiment may be implemented as a linear light source that includes a few to a few tens of laser light sources are implemented to project light of each of the red, green and blue colors and arranged in a three-row array. Furthermore, the plurality of linear light sources for each color may be alternately arranged in such a way that an R row, a G row and a B row are repeatedly arranged in a predefined order. Alternatively, the number of the laser light sources for a specific color may be greater than those for the other colors according to the amount of light emission and the display spectrum as that required for specific display application.

In yet another alternate embodiment, the three colors, R, G and B, may be alternately arranged in each of the linear array of laser light sources. The laser light sources for the same color, for example, the color R, may have different wavelengths as long as the deviation in wavelength is within a few nanometers. The number of colors is not limited to three, such as R, G and B, but may be four to six.

Similarly, when an LED light source is used as the light source 105, the LED light source may include a plurality of LED light sources arranged in an array with an arrangement similar as in the laser light source described above. Furthermore, a combination of a laser light source and an LED light source can also be used. Additionally, the light driver 104 may be provided for each color.

The motor driver 106 drives the filter unit 107 under the control of the controller 101. When the light source is a lamp-based light source or a light source that projects a light covering a spectral range, the filter unit 107 is implemented as a color wheel filter. In an exemplary embodiment, the filter unit may include a color wheel rotates according to a drive signal from the motor driver 106. The color wheel has, for example, color filters of three colors, R, G and B. When the motor driver 106 and the filter unit 107 are implemented according to such configuration, a color image is projected with the controller 101 controls each of the color filters on the color wheel for inserting each of these color filters in the light path at a predetermined timing. In contrast, when individual laser sources are used for projecting the lights of different colors, R, G and B, the color wheel may not be required. In this case, however, there may be provided a filter for changing the amount of light from each of the laser sources, or the projecting system may implement a diffuser that reduces coherency of light from each of the laser light sources and/or an optical filter. Furthermore, the filter may be implemented with a birefringent plate that changes the light path or the optical path length according to the polarization direction of the illumination light.

FIG. 3 diagrammatically shows the cross section of one of the deflectable spatial light modulating elements in the SLM 103.

As shown in FIG. 3, the deflectable spatial light modulating element includes a mirror plate 113 that reflects and hence deflects incident light 112 incident through a cover glass 111 and a hinge 115 that supports the mirror plate 113 above a substrate 114. The hinge 115 is made of elastic material so that the mirror plate 113 can be inclined within a predetermined range. In operation, a predetermined voltage is applied to an electrode 116 (electrodes 116a and 116b in the example shown in FIG. 3) provided on the substrate 114 so as to generate a Coulomb force, and the Coulomb force can attract and incline the mirror plate 113. The inclination of the mirror plate 113 is limited by a stopper 117 (stoppers 117a and 117b in the example shown in FIG. 3) and the substrate 114 supports the stoppers 117a and 117b. By reducing the voltage applied to the electrode 116 to zero when the mirror plate 113 is inclined, the elasticity of the hinge 115 allows the mirror plate 113 to oscillate.

In such a configuration, the controller 101 controls the mirror plate of each of the deflectable spatial light modulating elements in the SLM 103 to incline at a specific angle or set into oscillation to deflect the light incident on each of the deflectable spatial light modulating elements to various directions.

In the following description, the ON state or the term ON represents a controlled state of the mirror plate that the optical axis of the light deflected from the mirror plate coincides with the optical axis of a projection light path. Therefore, the ON light is the light deflected from the mirror plate in the ON state; and the ON time is the time when the mirror plate is in the ON state. On the other hand, the OFF state or the term OFF represents a controlled state of the mirror plate that the light deflected from the mirror plate does not enter the pupil of the projection light path. Therefore, the OFF light is the light deflected from the mirror plate in the OFF state. Furthermore, the Intermediate state represents a controlled state of the mirror plate that the light deflected from the mirror plate is projected into part of the projection light path as defined by the pupil of a projection optical system. The Intermediate light represents the light deflected from the mirror plate in the Intermediate state. The Intermediate state can be achieved by either maintaining the mirror plate inclined at a specific angle or by oscillating the mirror plate. The light deflected from the mirror plate is also called deflected light, reflected light or projected light. The light originating from the light source 105 and incident on the SLM 103 is also called incident light or illumination light. The mirror plate is also called a mirror or a mirror element.

The projection system according to this embodiment thus controls the state of the mirror plate in each of the deflectable spatial light modulating elements in the SLM 103 so as to produce display images with different level of gray scales. When a deflectable spatial light modulating element deflects the light from mirror in the ON direction, the reflected light from the SLM mirror is projected toward a projection lens. For the purpose of controlling the gray scales of a display image, the light projected for a minimum ON time for the mirror device expresses a minimum controllable gray scale. For example, in a system capable of expressing 8 bits or 256 gray scales, the mirror element is turned ON substantially throughout a period of 1/60 seconds, which is the one-frame image display period, in order to display the image with a 100% brightness. To display the image with a 1/256 of the 100% brightness, the mirror element is turned ON for 1/256 of 1/60 seconds. This minimum controllable ON time produces a bit when controlled by a digital controller and that is generally referred to as the least significant bit (LSB).

The mirror element is thus pulse-width modulation (PWM) controlled according to necessary brightness according to the predefined display image quality requirements. However, considering the mirror operation speed and the data transfer speed, the gray scales are limited to 8 to 9 bits at present. To address this problem, projected light that is reflected from the mirror set in the Intermediate state, which is in between ON and OFF, can be used to achieve a lower controllable brightness than the LSB. The minimum gray scale can also be displayed by oscillating the mirror at a predetermined amplitude and integrating reflected light during the oscillation state for a predetermined period.

The invention provides a system using a non-uniform light intensity distribution across the cross section of the reflected light flux from the mirror plate to achieve higher levels of controllable gray scales, as will be described later in detail. According to the invention, the system can be used in conjunction with and in addition to the techniques of controlling the Intermediate state or the oscillation state of the mirror to produce even higher levels of gray scales. Alternatively, the non-uniform intensity distribution of the illumination light reflected from the mirror elements of the SLM may be applied in combination with a conventional PWM-controlled mirror device. The light intensity distribution across the cross section of the reflected light flux from the mirror plate is obtained by processing an uniform illumination light flux to project on the mirror plate with a non-uniform intensity or having a non-symmetric intensity distribution over the cross section of the illumination light flux. The non-uniform light intensity distribution may be rotationally non-symmetric with respect to the optical axis of the illumination light flux or may have a plurality of peak intensities in the light flux. The system according to the invention can also use non-uniform light produced through scattering, diffraction or the like at the mirror plate. Diffraction occurs along each edge of the substantially rectangular mirror plate. In particular, when the incident light originates from a laser light source and hence has a coherent, well-defined first, second and higher order diffracted light. Alternatively, the surface of the mirror plate may have a step surface or an opening to generate diffracted light at the step surface or the opening.

For the purpose of increasing the number of gray scales, the projected light as that deflected by the deflective mirror plate in the SLM 103 has a non-symmetrical cross section of intensity distribution. This can be achieved by directing the projection path such that the projected light is a projected to a whole or a part of the cross section region of an optical device along the optical path. This can alternately achieved by providing a controller to control the length of time to hold the mirror at a particular deflection state or control the timing of change of mirror states. Alternately, this can also be achieved by generating intermediate gray scale by changing the oscillation movement of the mirror plate such that the mirror plate oscillations are continuous linear displacement of the device relative to the pupil along the projection light axis such that the projected light intensity at the cross section region generating a non-symmetrical light intensity distribution.

FIGS. 4A to 4C explain the ON state, Intermediate state, and OFF state in the projection system according to this embodiment.

FIGS. 4A(a) to 4C(a) diagrammatically show part of the configuration of the projection system according to this embodiment as well as the deflected light in the respective states of one of the deflectable spatial light modulating elements. FIGS. 4A(b) to 4C(b) diagrammatically show the projection light path (the pupil of the projection optical system) and the light flux cross sections of the deflected light in the respective states. In each figure, the solid line represents the projection light path and the dotted line represents the light flux cross section of the deflected light. FIGS. 4A(c) to 4C(c) diagrammatically show the light intensity distributions across the light flux cross sections in the respective states. The light intensity distributions across the cross section of the light beam are not uniform by deliberately controlling the uniformity of the illumination light flux incident on the mirror plate as well as scattering, diffraction or other non-uniform diffraction or reflection effects from the mirror plate, as described above.

As shown in FIG. 4A(a), in the ON state, the light originating from the light source 105 and incident on a mirror plate (also referred to as "mirror element") 113 through an incident light path 121 is deflected to a projection light path 122. The light that has entered the projection light path 122 is projected onto a screen 124. FIGS. 4A(b) and 4A(c) illustrate the light flux cross section of the deflected light covers the entire region of the projection light path 122. Part of the light flux cross section of the deflected light is absorbed in light dumps 123 (123a and 123b), which are made of light absorbing material, and will not enter the projection light path 122. As shown in FIG. 4B(a), in the Intermediate state, the light originating from the light source 105 and incident on the mirror plate 113 through the incident light path 121 is deflected to the projection light path 122 and the light dump 123a. Therefore, in an intermediate state, only light that has entered the projection light path 122 is projected onto the screen 124. In this case, as shown in FIGS. 4B(b) and 4B(c), only part of the light flux cross section of the deflected light transmits through part of the projection light path 122. The Intermediate state is achieved by maintaining the mirror plate 113 inclined at a specific angle or oscillating the mirror plate 113, as described above.

As shown FIG. 4C(a), in the OFF state, the light originating from the light source 105 and incident on the mirror plate 113 through the incident light path 121 is deflected to the light dump 123a and hence will not be projected onto the screen 124. As shown in FIGS. 4C(b) and 4C(c), the light flux cross section of the deflected light will not transmit through the projection light path 122.

As described above, in the projection system according to this embodiment, deflected light having non-uniform or non-symmetric light intensity distribution across the light flux cross section. The non-uniform or non-symmetric light intensity distribution is used to produce intermediate gray scales by controlling the period during which the direction of the deflected light is maintained in a specific direction or the timing at which the direction of the deflected light is continuously changed to control the total amount of light passing through the projection light path per unit time thus controlling the brightness of the display image and the gray scales In this way, by controlling the deflection direction of the light incident on each of the deflectable spatial light modulating elements in the SLM 103 according to the specifications required for the projection system, various intermediate amounts of light can be produced. The intermediate amounts of light may be, for example, ½, ¼ and ⅛ of the full amount of light in correspondence to the binary image data signals inputted to the controller, or may be, for example, ⅓, ⅕ and ⅒ of the full amount of light in correspondence to the non-binary data. Higher gray scales can be thus produced. Use of the light deflected in a direction close to the direction of the OFF light to produce intermediate gray scales could result in difficulty in separating the Intermediate light from the OFF light and may reduce the contrast. For this reason, higher numbers of gray scales may not be possible. The projection system according to this embodiment, however, is configured such that the amount of light is modulated to achieve higher gray scales, so that the contrast can be improved and higher gray scales can be produced by minimizing the amount of light entering the projection light path in the OFF state.

Second Embodiment

The projection system according to a second embodiment of the invention is a system in which the direction of the optical axis of the Intermediate light is limited. Other than the limited range of optical axis direction, the key configuration of the projection system according to the second embodiment is the same as that of the projection system according to the first embodiment described above.

The projection system according to this embodiment is configured such that for each of the deflectable spatial light modulating elements in the SLM 103. The optical axis of the Intermediate light lies in the space between two planes inclined ±15 degrees to the plane A including the optical axis of the light originating from the light source 105 and incident on the mirror plate and the optical axis of the OFF light. The plane A and the two planes having an incline angle of ±15 degrees relative to the plane A intersect on the reflection plane of the mirror plate.

FIGS. 5A to 5E explain the Intermediate light in the projection system according to this embodiment.

Figure 5A:
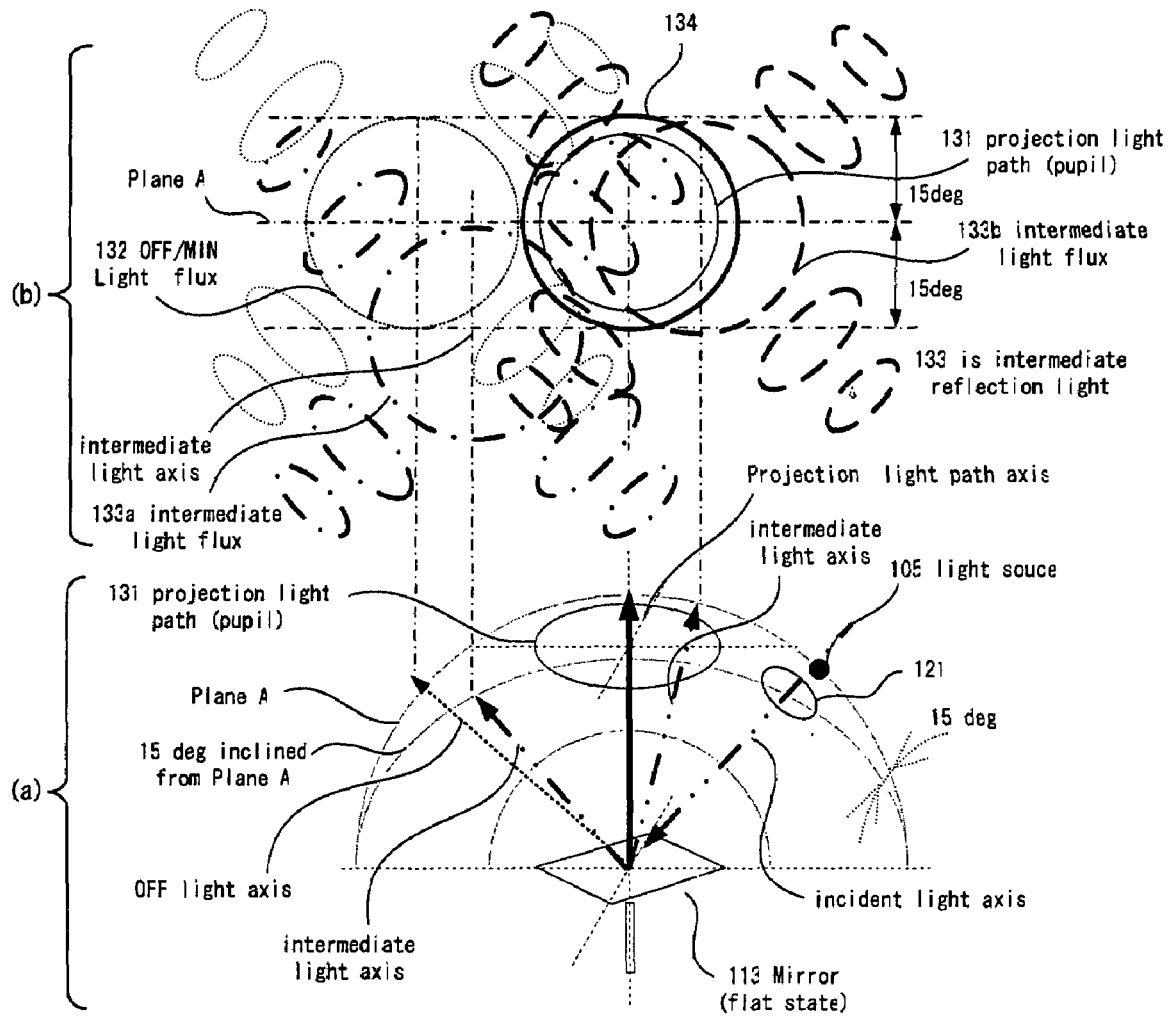
Figure 5B:
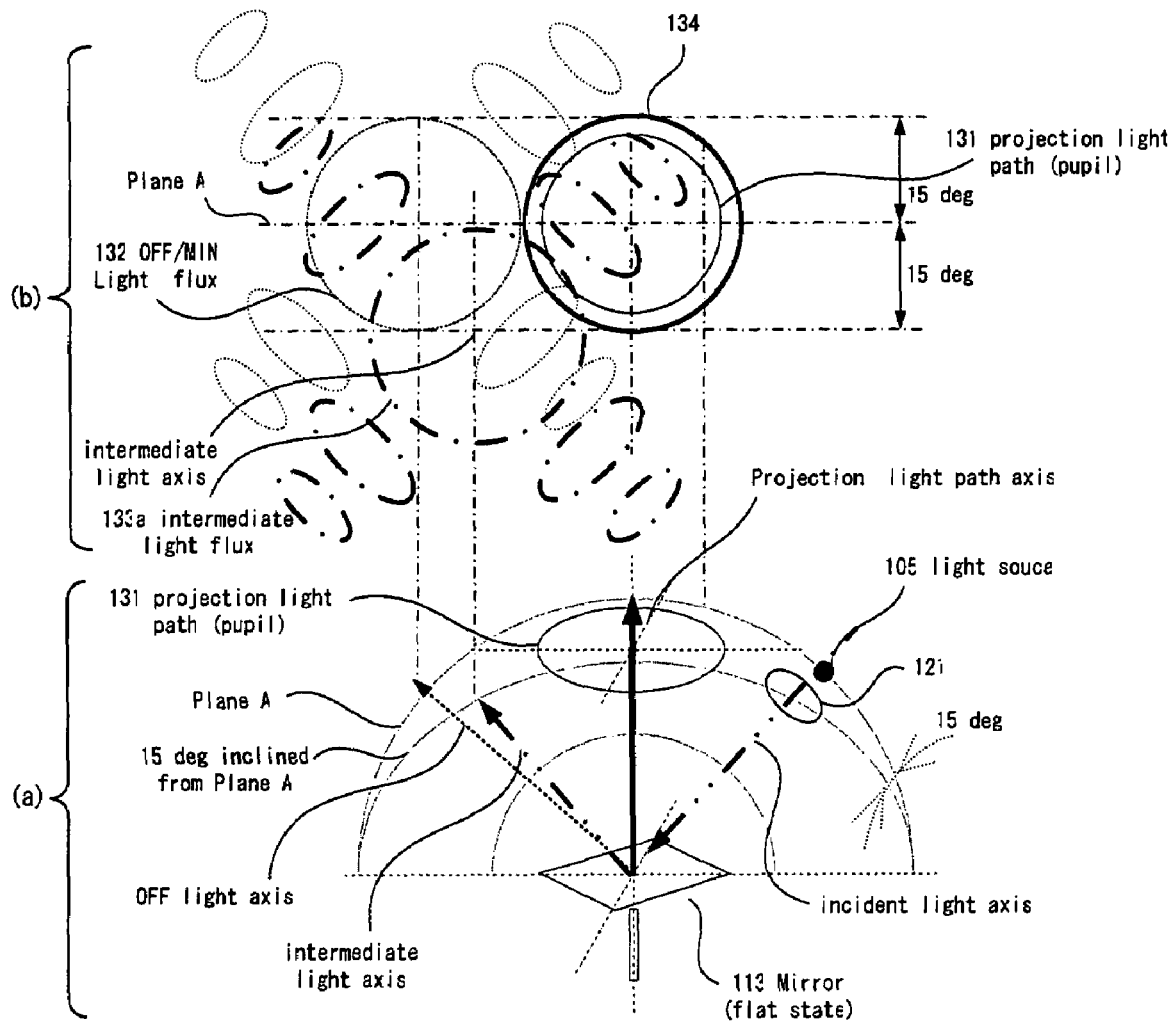
Figure 5C:
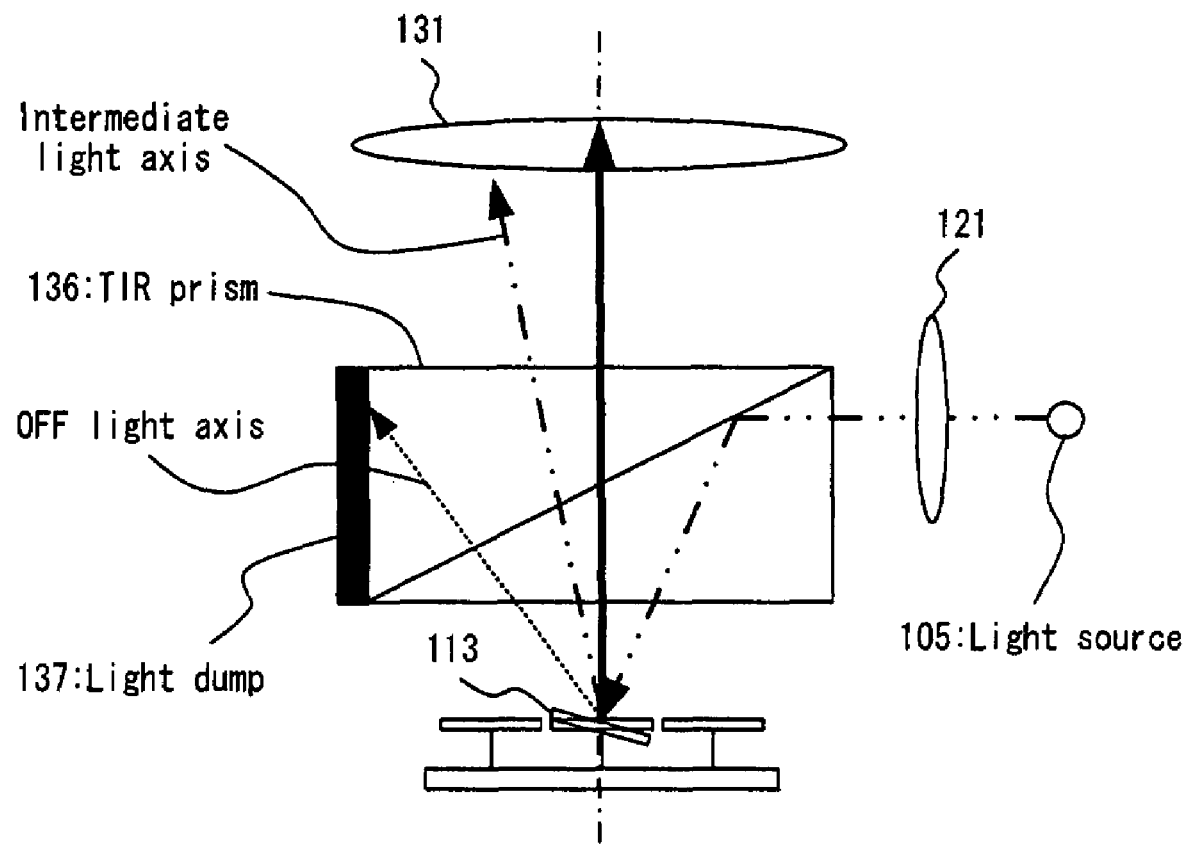
Figure 5E:
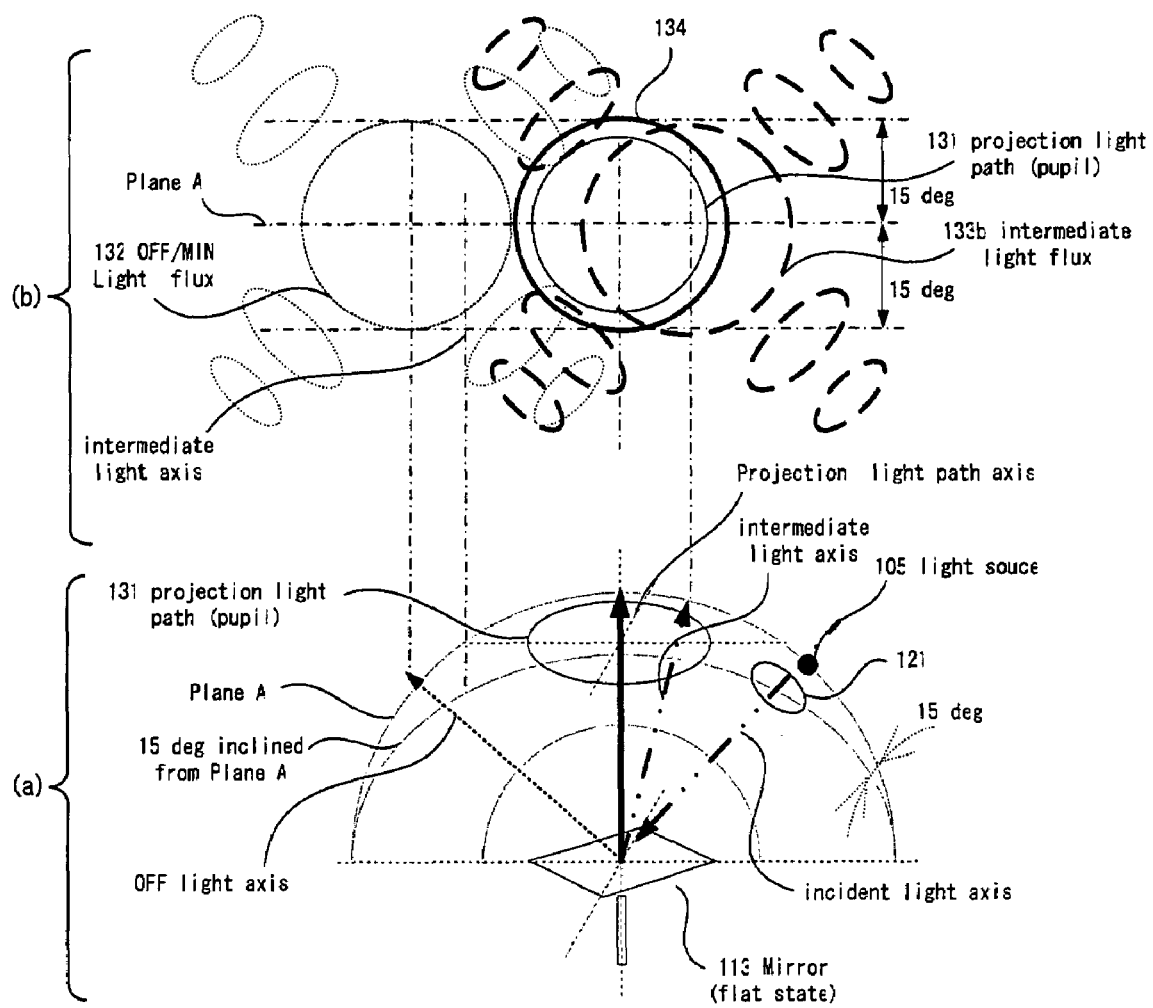

FIG. 5A shows two specific examples, i.e., specific examples 1 and 2, that have the Intermediate light in the same figure. FIG. 5B shows the specific example 1 extracted from FIG. 5A. FIGS. 5C and 5D explain the specific example 1 in more details. FIG. 5E shows the specific example 2 extracted from FIG. 5A.

FIGS. 5A(a), 5B(a) and 5E(a) diagrammatically show the optical axis of the light incident on the mirror plate (also simply referred to as "mirror") 113. These figures also show the optical axis of the OFF light, the optical axis of the Intermediate light, and the optical axis of a projection light path 131.

FIGS. 5A(b), 5B(b) and 5E(b) diagrammatically show the projection light path (the pupil of the projection optical system) 131, the light flux cross section 132 of the OFF light, the light flux cross sections 133 (133a and 133b) of the Intermediate light, and the light flux cross section 134 of the ON light. A plurality of small light flux cross sections that appear in the four directions around the light flux cross section 132 of the OFF light represent the light flux cross sections of diffracted light generated in the OFF state. Similarly, a plurality of small light flux cross sections that appear in the four directions around the light flux cross sections 133 of the Intermediate light represent the light flux cross sections of diffracted light generated in the Intermediate state. When the light source produces laser light, well-defined diffracted light shown in the figures can be produced. When the light source is a lamp or the like, a smoothly spread-out light flux can be produced. The Intermediate light in the specific example 1 is first described below with reference to FIGS. 5A to 5D.

As shown in FIGS. 5A and 5B, in the specific example 1, the optical axis of the Intermediate light is inclined 15 degrees relative to the plane A that includes the optical axis of the incident light and the optical axis of the OFF light. In this case, only part of the diffracted light generated in the Intermediate state passes through the projection light path 131. This portion of the diffracted light becomes the amount of the exiting light that has a smaller controllable amount of light transmission thus allowing higher number of controllable gray scales. In the meantime, the diffracted light that appears in the four directions around the OFF light in the OFF state will not enter the projection light path 131, so that high contrast can be maintained.

When the illumination light flux from a lamp-based light source is uniform and the deflection angle θ between the mirror plate in the horizontal state and the mirror plate in the ON state is 15 degrees, the optical axis of the illumination light flux is incident along a direction at about 2θ=30 degrees to a normal to the mirror array. The reflected light flux in the ON state enters the projection light path disposed substantially in the direction of the normal to the mirror array. The illumination light flux is configured such that the angle between the optical axis of the illumination light flux and the outermost ray of the illumination light flux is also 15 degrees. The optical axis of the ON light coincides with the direction of the normal to the mirror array. Therefore, the cone of the illumination light flux and the cone of the projected light flux are laid out such that these cones are substantially adjacent to each other when the mirror plate is in the ON state. This layout improves the efficiency in space.

The approximate circumferential length across the angle between the optical axis of the illumination light flux and the outermost ray of the illumination light flux is called NA and NA=sin θ. When θ is 15 degrees, NA is about 0.26. The brightness of the projection lens is determined by Fno=1/(2× NA), which is equal to about 2 in the above case. The focal length f of the projection lens determines the pupil diameter D, which is the light path of the projection optical system.

The optical axis of the reflected light when the mirror is horizontally oriented is deflected in the direction apart from the projection light path by 30 degrees relative to the optical axis in the direction of a normal to the mirror array. The OFF state is obtained when the mirror is controlled to incline opposite to the ON state with the reflected light projected away from the projection light path. The light path of the OFF state is therefore projected away from the light path of the illumination light flux as much as possible. Therefore, the illumination flux of either non-uniformity or non-symmetry illumination cross section when incident on the mirror plate will not enter the projection light path and the contrast of the display image is improved. In the Intermediate state, when the deflection direction of the mirror is inclined 7.5 degrees to the substantially horizontal state of the mirror in the direction perpendicular to the plane A, the optical axis of the Intermediate light is inclined less than 30 degrees to the normal to the mirror array in the OFF direction in the plane A and 15 degrees to the normal to the mirror array in the direction perpendicular to the plane A. By setting the deflection direction of the mirror outside the span of the plane A, the amount of light flux passing through the projection light path can be controlled to have an arbitrarily amount of variation. Furthermore, as the reflected light flux is non-uniform or non-symmetric, the same reflected light flux can be flexibly controlled to generate a desired amount of light to be transmitted.

The deflection angle of the mirror in the Intermediate state, which is 7.5 degrees, is smaller than the deflection angle of the mirror in the ON state. This allows the voltage for controlling the mirror to be the same as or smaller than that used for the ON or OFF direction. Depending on the cross-sectional shape and the structure of the spring of the elastic member that supports the mirror, the strength of the spring, i.e., the elasticity of the mirror hinge, when the mirror is deflected in the direction in the plane A may differ from that in the direction perpendicular to the plane A. In such case, the control voltage for deflecting the mirror in the Intermediate state may be different from those used in the ON and OFF states. When the strength of the spring in the Intermediate state is higher than those in the ON and OFF states, the deflection angle may be smaller, such as 2 degrees and 4 degrees, in the direction perpendicular to the plane A.

When the deflection angle of the mirror in the ON state is 12 degrees, the angle between the optical axis of the illumination light flux and the normal to the mirror array is 24 degrees. It is entirely possible to flexibly manage this situation by changing the angle in the Intermediate state according to necessary intermediate gray scales.

FIGS. 5C and 5D are side diagrammatic views to more specifically illustrate the configuration shown in FIG. 5B(a). FIG. 5C is a diagram viewed in the direction perpendicular to the plane A. FIG. 5D is a diagram obtained when the configuration shown in FIG. 5C is viewed along a direction from the light source 105 side. For practical implementation a TIR prism 136 is employed that is not specifically shown in FIGS. 5A and 5B. The light from the light source 105 is incident on the mirror plate 113 through the TIR prism 136. The ON light and part of the Intermediate light enter the projection light path 131 through the TIR prism 136. The OFF light is absorbed in a light dump 137 that is a light absorbing member provided in the TIR prism 136.

FIGS. 5A to 5D thus show the orientations of the Intermediate state wherein the light is projected in a direction apart from the direction of the OFF light. The Intermediate projection can be used to produce controllable intermediate gray scales. Furthermore, it is unlikely that there will be light enters the projection light path 131 in the OFF state. Unlike the conventional techniques, additional gray scales are generated without sacrificing the contrast of the display quality.

Alternatively, it is further possible to configure the optical display system as shown in example 1 in such a way that the inclination of the mirror plate in the Intermediate state is the same as that of the mirror plate in the ON state or the OFF state (15 degrees, for example). With such configuration, the optical axis of the Intermediate light lies in the space between the two planes with inclined angles of ±15 degrees relative to the plane A. The height of an electrode for inclining the mirror plate and the height of a stopper (not shown) for defining the inclination of the mirror can be the same as those for the ON state or the OFF state.

The Intermediate light in the specific example 2 is described below with reference to FIGS. 5A and 5E.

As shown in FIGS. 5A and 5E, in the specific example 2, the optical axis of the Intermediate light lies in the plane A including the optical axis of the incident light and the optical axis of the OFF light. The optical axis of the Intermediate light is on the opposite side of the projection light path 131 to the optical axis of the OFF light. In this case, the amount of the Intermediate light is controllable to be close to the amount of light in the ON state. Furthermore, the intermediate gray scales can be produced in a brightness range that is further apart from the OFF light. Therefore, the contrast of an image display with a low brightness near the OFF state can be further improved.

Third Embodiment

The projection system according to a third embodiment of the invention is a system in which the direction of the optical axis of the Intermediate light is limited within a range that is different from the projection system according to the second embodiment described above. The key configuration of the projection system according to the third embodiment is the same as that of the projection system according to the first embodiment described above.

The projection system according to this embodiment is configured such that in each of the deflectable spatial light modulating elements in the SLM 103, the optical axis of the Intermediate light lies in a cone. the center axis of rotation of the cone is a normal to the deflectable spatial light modulating element. The curved surface of the cone includes the optical axis of the OFF light. The projection system according to this embodiment includes two light sources. The light source is configured such that the light beams from the two light sources are incident on the mirror plate in the directions apart from each other by 90 degrees.

FIG. 6 explains the Intermediate light in the projection system according to this embodiment.

FIG. 6(a) diagrammatically shows optical axes 141a and 141b of the two incident light beams incident on the mirror plate 113. The optical axis 142a of the OFF light is generated from the incident light having the optical axis 141a. The optical axis 142b of the OFF light is generated from the incident light having the optical axis 141b. The optical axis 143a of the Intermediate light is generated from the incident light having the optical axis 141a. The optical axis 143b of the Intermediate light is generated from the incident light having the optical axis 141b.

FIG. 6(b) diagrammatically shows a projection light path with a pupil of a projection optical system 148. The light flux cross section 144 of the OFF light is along an optical axis 142b. The light flux cross section 145a of the Intermediate light is projected along an optical axis 143a. The light flux cross section 145b of the Intermediate light is projected along an optical axis 143b. The light flux cross-section 149 represents a light projection of the ON light. A plurality of small light flux cross sections that appear in the four directions around the light flux cross section 145a of the Intermediate light represent the light flux cross sections of diffracted light generated from the incident light having the optical axis 141a in the Intermediate state. Similarly, a plurality of small light flux cross sections that appear in the four directions around the light flux cross section 145b of the Intermediate light represent the light flux cross sections of diffracted light generated from the incident light having the optical axis 141b in the Intermediate state.

As shown in FIG. 6, the optical axes 142a and 142b of the two OFF light beams are deflected by a predetermined angle from the optical axis of the projection light path 148 that coincides with a normal to the deflectable spatial light modulating element. Furthermore, the optical axes 142a and 142b of the two OFF light beams are included in the curved surface of the cone with the optical axes 143a and 143b of the Intermediate light beams lie in the cone.

According to FIG. 6, both of the optical axes 143a and 143b of the Intermediate light beams lie in the cone. The center axis of rotation of the cone is the optical axis of the projection light path 148. The projection light path 148 is further a normal to the deflectable spatial light modulating element. Thus the curved surface of the cone includes the optical axes 142a and 142b of the OFF light beams. The space 146 shown in FIG. 6(a) represents part of the cone. The cross section 147 shown in FIG. 6(b) represents the cross section of the cone at the position of the pupil of the projection optical system.

Since the optical axes 143a and 143b of the Intermediate light beams lie in such a range, part of the light flux cross section of one of the two Intermediate light beams having non-uniform light intensity distributions can be superimposed on the other, as shown in FIG. 6(b). The exiting light generated from superimposed intermediate lights can be applied to flexibly control to generate additional levels of gray scales.

In this embodiment, the inside of the cone includes the curved surface of the cone.

In this embodiment, although the description has been made of the case where the two light sources are used to radiate light beams in the directions different from each other by 90 degrees, it is also possible to radiate light beams from other with different relative angles between the incident lights projected from these two light source. Furthermore, the light sources may have different amounts of light, different colors and the like. Moreover, it is also possible to provide only one light source, while providing various deflection directions of the mirror as in this embodiment.

Fourth Embodiment

The projection system according to a fourth embodiment of the invention is a system in which the direction of the optical axis of the illumination light and the direction of the optical axis of the OFF light are limited. The key configuration of the projection system according to the fourth embodiment is the same as that of the projection system according to the first embodiment described above.

The projection system according to this embodiment is configured such that in each of the deflectable spatial light modulating elements in the SLM 103, the incident light from the light source 105 is incident on the deflectable spatial light modulating element at right angles. The optical axis of the OFF light lies in an angular range other than the partial plane between the optical axis of the incident light and the optical axis of the projection light path in the plane including the optical axis of the incident light and the optical axis of the projection light path. Alternately, the optical of the OFF light may with a range of angular directions other than the plane including the optical axis of the incident light and the optical axis of the Intermediate light.

FIGS. 7A and 7B explain the incident light and the OFF light in the projection system according to this embodiment.

A description will first be made of the case where the optical axis of the OFF light lies in the region other than the partial plane between the optical axis of the incident light and the optical axis of the projection light path in the plane including the optical axis of the incident light and the optical axis of the projection light path with reference to FIG. 7A.

As shown in FIG. 7A, the partial plane B is the partial plane in the plane including the optical axis 151 of the light originating from the light source 105 through the incident light path 121 and incident on the deflectable spatial light modulating element including the mirror plate 113 at right angles (incident light). The optical axis 152 is for a projection light path 160, that is the partial plane sandwiched between the optical axis 151 of the incident light and the optical axis 152 of the projection light path 160. The optical axis 153 of the OFF light lies in the region other than the partial plane B.

When the incident light is incident on the deflectable spatial light modulating element at right angles with, the illumination light incident on the SLM 103 at right angles, unnecessary stationary light from the SLM 103 is likely generated and enters into the projection light path. It is therefore desirable to incline the projection light path 160 to make it off-centered, as shown in FIG. 7A. Furthermore, in the example shown in FIG. 7A, the optical axis 154 of the Intermediate light is deflected toward the optical axis 152 of the projection light path 160 and apart from the optical axis 151 of the illumination light to produce intermediate gray scales. Since the optical axis 153 of the OFF light is disposed on the opposite side of the optical axis 151 of the illumination light to the optical axis 152 of the projection light path 160, in the contrast of the image may be further improved.

A description will now be made of the case where the optical axis of the OFF light lies in the region other than the plane including the optical axis of the incident light and the optical axis of the Intermediate light with reference to FIG. 7B. FIG. 7B shows two examples of the optical axis of the Intermediate light in the same figure.

As shown in FIG. 7B, the optical axis 156 represents the optical axis of the Intermediate light, and the plane C is the plane that includes the optical axis 156 and the optical axis 155 of the light. A light projection is originated from the light source 105, passes through the incident light path 121, reflected from an optical element (not shown). The optical elements deflects the illumination along a light path or separates the deflected light from the projected light, through an optical device such as a half-silvered mirror and a polarization-type separation element, for incident on the deflectable spatial light modulating element including the mirror plate 113 at right angles (incident light). The optical axis 158 of the OFF light lies in the region outside of the space covered by the plane C.

Similarly, the optical axis 157 is the optical axis of the Intermediate light, and the plane D represents the plane that includes the optical axis 157 and the optical axis 155 of the incident light. The optical axis 158 of the OFF light lies in the angular range outside the space covered by the plane D. The plane D is a plane inclined 90 degrees relative to the plane C. In this example, the optical axis 159 of the projection light path 160 is also perpendicular to the deflectable spatial light modulating element including the mirror plate 113. In other words, the optical axis 159 of the projection light path 160 coincides with the optical axis 155 of the incident light.

When the optical axis of the incident light is perpendicular to the deflectable spatial light modulating element and coincides with the optical axis of the projection light path as described above, the optical axis of the illumination light is perpendicular to the SLM and coincides with the optical axis of the projection light path. This configuration generates stationary light that is not useful for image display will likely reflects off from the SLM substrate into the projection light path. To reduce the amount of the stationary light entering the projection light path in the OFF state, the incident light is reflected in a direction different from the directions of the optical axes 156 and 157 of the Intermediate light in the OFF state, as shown in FIG. 7B, allowing reduction in the amount of the reflected light toward the projection light path 160 in the OFF state.

Furthermore, when the light source emits highly coherent light, such as a laser, small divergence of the light flux allows a small NA of the light flux, for example, 0.1 or smaller, for example, 0.07. It is therefore possible to set the incident light substantially perpendicular to the deflectable spatial light modulating element array, for example, with angular direction of 12 to 8 degrees relative to a normal to the deflectable spatial light modulating element array. In this case, the incident light can be separated from the reflected light by a small angle, and an optical element for correcting the small angular deviation may therefore be provided in the projection light path without using any optical element for deflecting the illumination light path or separating it from the projected light.

Fifth Embodiment

The projection system according to a fifth embodiment of the invention is a system in which the direction of the optical axis of the projection light path and the direction of the optical axis of the Intermediate light are limited. The key configuration of the projection system according to the fifth embodiment is the same as that of the projection system according to the first embodiment described above.

The projection system according to this embodiment is configured such that in each of the deflectable spatial light modulating elements in the SLM 103, the optical axis of the projection light path is perpendicular to the deflectable spatial light modulating element and the optical axis of the Intermediate light lies between the optical axis of the light incident on the mirror plate and the optical axis of the projection light path.

FIGS. 8A and 8B explain the projection light path and the Intermediate light in the projection system according to this embodiment. FIG. 8A shows an example in which one light source is used, and FIG. 8B shows an example in which two light sources are used.

A description will first be made of the case where one light source is used with reference to FIG. 8A.

FIG. 8A(a) diagrammatically shows the optical axis 161 of the incident light on the mirror plate 113 wherein the optical axes 162 (162a and 162b) are the optical axies for the Intermediate light, and the optical axis 164 is for a projection light path 163. The optical axis 164 of the projection light path 163 is perpendicular to the deflectable spatial light modulating element including mirror plate 113, thus perpendicular to the SLM 103. FIG. 8A(b) diagrammatically shows the projection light path through the pupil of the projection optical system 163 wherein the light flux cross sections 165 (165a and 165b) represents the light flux cross sections of the Intermediate light, and the light flux cross section 166 is for the ON light. The Intermediate light having the light flux cross section 165a is the Intermediate light transmitted along the optical axis 162a, and the Intermediate light having the light flux cross section 165b is the Intermediate light transmitted along the optical axis 162b. FIG. 8A(c) diagrammatically shows the light flux cross sections generated from the oscillating state of the mirror plate 113 in the Intermediate state.

FIG. 8A shows an intermediate image display state wherein the state of the mirror plate 113 is inclined with smallest angle relative to the optical axis 161 of the incident light. This intermediate state is generated with the mirror plate 113 abuts a stopper 167 disposed on a substrate 114. The deflected light in this state is the Intermediate light that is transmitted along the optical axis 162a. The greatest brightness is obtained when the optical axis of the deflected light (reflected light) coincides with the optical axis 164 of the projection light path 163. On the other hand, by oscillating the mirror plate 113 when the mirror plate 113 is most inclined toward the optical axis 161 of the incident light, the amount of light that exits from the projection light path 163 is greater than that in the Intermediate state in which the mirror plate 113 is most inclined. Therefore, image displays with relatively brighter intermediate gray scales can be easily produced.

A description will now be made of the case where two light sources are used with reference to FIG. 8B that diagrammatically shows the state of the mirror plate in the Intermediate state.

As shown in FIG. 8B, the mirror plate 113 abuts a stopper 168 disposed on the substrate 114 in the Intermediate state wherein the mirror plate is position at a predetermined incline angle. Two light sources 5a and 5b are used as the light source. The light source 5a is used to produce intermediate gray scales. In the Intermediate state, the incident light transmitted along the optical axis 171 projected from the light source 5a produces deflected light transmitted along the optical axis 172. The light source 5b is disposed in a position where a maximum amount of light is projected from the projection light path. In such a configuration, only an intermediate amount of light is controlled to project into the projection light path, the light source 5b may be turned off or the amount of light from the light source 5b may be reduced. In this way, by using a plurality of illumination light paths or divided illumination light paths to illuminate the mirror plate from various directions, intermediate gray scales can be easily produced and hence higher gray scales can be produced.

In particular, when LED or laser light sources are used as the light source, it is easy to use a plurality of individually controllable light sources. In this case, it is easier to control the light source to turn on and off and also to change the amount of light, as compared to the case where a lamp-based light source is used. When the light source is implemented with a plurality of sub-light sources, each of the sub-light sources can be controlled to change the intensity distribution of the overall illumination light flux.

When the light source emits highly coherent light, such as a laser light source, a small divergence of the light flux allows a small NA of the light flux. It is therefore easy to design and control an illumination light path for each light source.

In the example shown in FIG. 8B, the optical axis 173 of the projection light path is perpendicular to the deflectable spatial light modulating element of the mirror plate 113, and the optical axis is perpendicular to the SLM 103.

Sixth Embodiment

The projection system according to a sixth embodiment of the invention is a system in which the position of a flat surface that absorbs the OFF light is limited. The key configuration of the projection system according to the sixth embodiment is the same as that of the projection system according to the first embodiment described above.

The projection system according to this embodiment is configured such that the flat surface that absorbs the OFF light in each of the deflectable spatial light modulating elements in the SLM 103 lies in the region other than the plane including the optical axis of the incident light and the optical axis of the projection light path.

FIGS. 9A and 9B are diagrams to show the flat surface that absorbs the OFF light in the projection system according to this embodiment. FIG. 9A diagrammatically shows part of the configuration of the projection system according to this embodiment, and FIG. 9B diagrammatically shows a side of the configuration shown in FIG. 9A.

As shown in FIGS. 9A and 9B, in the projection system the OFF light from the mirror plate 113 is all absorbed in a light dump 180. The light dump 180 is a light absorbing member disposed on a plane other than the plane including the optical axis 177 of the light projected from the light source 105 and incident on the mirror plate 113 through the incident optical path 121 and a TIR prism 176 as well as the optical axis 179 of a projection light path 178. The optical axis 181 represents the optical axis of the Intermediate light.

Therefore, the OFF light is transmitted along a light path that is separated from the projection light path 178. In an OFF state, it is unlikely that light will enter into the projection light path 178, and the contrast of the display image is further improved.

Although the first to sixth embodiments have been described above, each of the embodiments can be further configured as follows.

First, the projection system according to each of the embodiments can also be configured such that in each of the deflectable spatial light modulating elements in the SLM 103, at least the Intermediate light includes scattered light or diffracted light from the deflectable spatial light-modulating element. An example of such a configuration is further described below with reference to FIGS. 10A and 10B.

FIG. 10A diagrammatically shows the SLM 103 illuminated with a coherent illumination light beam. FIG. 10B diagrammatically shows positional relationship of the light intensity distribution across the light flux cross sections of the deflected light at the pupil of the projection optical system in the ON state, Intermediate state, and OFF state with the pupil of the projection optical system. It is noted that FIG. 10B shows relative positions of the pupil of the projection optical system for the positional relationship in the Intermediate state and the OFF state.

When each of the deflectable spatial light modulating elements in the SLM 103 is a few-micrometer square element and coherent illumination light, such as laser light, illuminates each of the elements as shown in FIG. 10A, the edges of the mirror plate produce diffracted light with a well-defined brightness distribution pattern. The diffracted light is also deflected to the pupil of the projection optical system in each of the states as shown in FIG. 10B. FIG. 10B shows the light intensity distribution across the light flux cross-sections of the deflected light.

FIG. 10B shows the relative positions of the pupil of the projection optical system in the Intermediate state, and projection of the diffracted light enters the pupil of the projection optical system in the Intermediate state. The diffracted light with well defined projection pattern can be used to produce controllable intermediate gray scales in the Intermediate state. The OFF position represents the relative position of the pupil of the projection optical system when the diffracted light does not enter the pupil of the projection optical system.

The projection system according to each of the embodiments can also be configured to further include a light attenuator that reduces the average light level of the light intensity distribution across the light flux cross section of the Intermediate light projected from the projection light path. Furthermore, the light attenuator may be implemented with a color filter, a half-silvered mirror, a polarizer, an optical system stop or optical devices that perform similar optical attenuation functions. An example of such a configuration is described in FIG. 11 below.

FIG. 11 shows an exemplary image display system implemented with a light attenuator 186. Further embodiments of light attenuator in a projection system according to this invention may include a color wheel, a color filter, a half-silvered mirror, a polarizer and an optical system stop, between the pupil of the projection optical system 122 and a screen 124 in the projection light path in order to further attenuate the light that exits from the pupil of the projection optical system 122. The average light level of the light intensity distribution across the light flux cross section of the exiting light can be set to a desired amount of light and gray scales can also be accurately controlled.

Furthermore, a more refined gray scale adjustment many be accomplished by synchronizing the control timing of the Intermediate state with the attenuation timing of the light attenuator 186. When all the deflectable spatial light modulating elements in the SLM 103 are used to perform an RGB sequential color operation, the gray scales can be controlled to vary for each color by performing the synchronizing operation according to the control timing sequence for each color.

In the projection system according to each of the embodiments, the light illumination source 5 may be implemented with a laser light source or an LED light source or other kinds of illumination light sources, as described above.

The projection system according to each of the embodiments can also be configured by using the illumination light includes a plurality of colors. In this case, the projection system can also be configured such that the illumination directions or the deflection directions of the colors are different from other colors.

The projection system according to each of the embodiments can also be configured to have a plurality of light sources or a plurality of illumination light paths. In this case, at least the direction of the Intermediate light for each light source or each illumination light path can be different from those of the other light sources or illumination light paths. Examples of the plurality of light sources include a plurality of light sources, each having a plurality of sub-light sources arranged in an array.

In the projection system according to each of the embodiments in which the direction of the optical axis of the Intermediate light differs from those of the other deflected light (the ON light and the OFF light). The projection system can also be configured such that the inclination direction of the mirror plate in the Intermediate state differs from those of the mirror plate in the other states (the ON state and the OFF state) and a motion stopper that stop mirror plate to generate the Intermediate state for producing the intermediate gray scales while the mirror plate remains stationary. An example of such a configuration is described below with reference to FIGS. 12 and 13.

FIG. 12 is a diagrammatic top view of a deflectable spatial light modulating element provided with a motion stopper.

FIG. 13 diagrammatically shows the incident light and the deflected light in such a deflectable spatial light modulating element. FIG. 13(a) diagrammatically shows the incident light and the deflected light. FIG. 13(b) diagrammatically shows a side of the deflectable spatial light modulating element in the Intermediate state. FIG. 13(c) diagrammatically shows another side of the deflectable spatial light modulating element in the ON state.

FIG. 12 shows a deflectable spatial light modulating element in the SLM 103 includes four electrodes 191, 192, 193 and 194 on the substrate 114 along the diagonal lines of the mirror plate 113 as well as four motion stoppers 195, 196, 197 and 198 in correspondence to the electrodes. The electrode 194 is applied a voltage for moving the mirror elements to the Intermediate state, and the electrodes 191 and 193 are used for positioning the mirror element to the ON state and the OFF state, respectively.

FIG. 13 shows the optical projection when a predetermined voltage is applied to the electrode 194 to incline the mirror plate 113 in the Intermediate state. The mirror plate 113 abuts the stopper 198 and then remains stationary (see FIG. 13(b)). Then, the mirror plate 113 deflects the incident light as the Intermediate light. It is noted that the optical axis 201 represents the optical axis of the incident light; the optical axis 202 represents the optical axis of the Intermediate light; and the optical axis 203 represents the optical axis of a projection light path 204.

In the ON state, a predetermined voltage is applied to the electrode 191 to incline the mirror plate 113, so that the mirror plate 113 abuts the stopper 195 and then remains stationary (see FIG. 13(c)). Then, the mirror plate 113 deflects the incident light from the light source 105 as the ON light. It is noted that the optical axis 203 represents the optical axis of the ON light.

In FIG. 13, the optical axis 205 represents the optical axis of the deflected light from the mirror plate 113 when the mirror plate 113 is parallel to the substrate 114. The optical axis 206 represents the optical axis of the OFF light.

As the inclination direction of the mirror plate 113 is set in the Intermediate state that is different from those of the mirror plate 113 in the other states (the ON state and the OFF state) wherein the stopper 198 is implemented to stop the mirror plate 113 to rest in the Intermediate state to produce intermediate gray scales. A stable intermediate state is generated because the mirror plate 113 remains stationary, the intermediate gray scales can be produced in a stable manner.

In the projection system according to each of the embodiments described above, the direction of the optical axis of the Intermediate light differs from those of the other diffracted light (the ON light and the OFF light). It is clearly that when the inclination direction of the mirror plate is different from those of the mirror plate in the other states (the ON state and the OFF state) and the motion stopper that puts the mirror plate into rest in the Intermediate state is provided to produce intermediate gray scales while the mirror plate remains stationary as described above, the electrode and the motion stopper for the Intermediate state can be different from the electrodes. Furthermore, the motion stoppers for the other states (the ON state and the OFF state) (motion stoppers that put the mirror plate into rest in the other states) are also different in terms of at least one of the position, height, shape, size, material and direction from that of the intermediate state. In this case, the motion stopper for the Intermediate state or the motion stoppers for the other states can also be made of materials that are substantially transparent or low-reflectance material.

An example of such a configuration is described below with reference to FIG. 14.

FIG. 14 diagrammatically shows a deflectable spatial light modulating element configured such that the electrode and the motion stopper for the Intermediate state differ from the electrodes and the motion stoppers for the other states (the ON state and the OFF state). FIG. 14(a) diagrammatically shows the top surface of the deflectable spatial light modulating element; FIG. 14(b) diagrammatically shows a side of the deflectable spatial light modulating element in the intermediate state; and FIG. 14(c) diagrammatically shows another side of the deflectable spatial light modulating element in the ON state.

As shown in FIG. 14(a), each of the deflectable spatial light modulating elements in the SLM 103 includes three electrodes 211, 212 and 213 on the substrate 114. There are three motion stoppers 214, 215 and 216 correspond to the respective electrodes. The stoppers 214 and 215 are provided on the substrate 114, and the stopper 216 is provided on the lower surface of the cover glass 111. The stopper 216 is a substantially transparent stopper. The electrode 213 is the electrode for the Intermediate state, and the electrodes 211 and 212 are the electrodes for the ON state and the OFF state, respectively. Correspondingly, the stopper 216 is the stopper for the Intermediate state, and the stoppers 214 and 215 are the stoppers for the ON state and the OFF state, respectively.

FIG. 14(b) shows an intermediate state by applying a predetermined voltage to the electrode 213 to incline the mirror plate 113. In the intermediate state, the mirror plate 113 abuts the stopper 216 and then remains stationary. In this way, the Intermediate light is produced. The optical axis 217 represents the optical axis of the Intermediate light, and the optical axis 219 represents the optical axis of the projection light path.

FIG. 14(c) shows an ON-state by applying a predetermined voltage to the electrode 211 to incline the mirror plate 113. In the ON-state, the mirror plate 113 abuts the stopper 214 and then remains stationary. The incident light from the light source 105 is thus deflected from the mirror plate 113 to produce the ON light. The optical axis 218 represents the optical axis of the incident light, and the optical axis 219 also represents the optical axis of the ON light. The optical axis 220 represents the optical axis of the deflected light from the mirror plate 113 when the mirror plate 113 is parallel to the substrate 114.

As described above, the position of the stopper and the driving voltage applied to the electrode for the Intermediate state can be different from the positions of the stoppers. The driving voltages applied to the electrodes for the other states (the ON state and the Intermediate state) are also different to allow for higher degree of freedom of control to generate the desired intermediate gray scales.

When a stopper is provided on the cover glass 111 side, in order to reduce the impact on the reflected light, the stopper can be made of substantially transparent material, as in the stopper 216. Alternately, the stopper can be made of light-absorbing, low-reflectance material so as to minimize the impact on the projected light.

Alternatively, in the projection system according to each of the embodiments, the illumination light can include a plurality of colors, and the amount of light of at least one of the colors directed to the screen 124 in the Intermediate state can be about 10 to 33% of the amount of light directed to the screen 124 in the ON state.

In the projection system according to each of the embodiments, when a laser light source or an LED light source is used as the light source, the laser light source or the LED light source further includes a light source control circuit that controls any one of the light emission intensity, the number of light emitting sources and the frequency of light emission of the light source. The amount of light directed to the screen 124 in the Intermediate state can be about 10 to 33% of the amount of light directed to the screen 124 in the ON state.

According to the invention described above, the deflection direction of the light incident on each of the deflectable spatial light modulating elements in the SLM is controlled according to the specifications required for the projection system. The projection system thus allows for various intermediate amounts of light and higher gray scales to be produced. Furthermore, the amount of light entering the projection light path in the OFF state can be minimized, allowing improvement in contrast.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. A projection device receiving a light from a light source through an illumination optics for projecting to a spatial light modulator having a plurality of micromirrors controlled to different deflection angles, said projection device further comprising:
   a controller that receives and applies an input signal to control each of said micromirrors to deflect to a first deflection angle along an ON direction and a second deflection angle along an OFF direction and to operate in an intermediate state for reflecting an intermediate light having an intermediate intensity between light intensities reflected by said micromirrors in said ON and OFF directions wherein said micromirrors reflect said intermediate light having a non-uniform and/or asymmetrical intensity distribution across a cross section of an intermediate light flux from the micromirrors.

2. The projection device of claim 1 wherein:
said micromirrors further reflect said intermediate light flux having a different cross sectional area from an optical pupil of an image projection lens along a projection light path for projecting an image on a display screen.

3. The projection device of claim 1 wherein:
said micromirrors further reflect said intermediate light flux having a different cross sectional shape that a shape of an optical pupil of an image projection lens along a projection light path for projecting an image on a display screen.

4. The projection device of claim 1 wherein:
said micromirrors further reflect said intermediate light flux having a cross section overlapped partially with an optical pupil of an image projection lens along a projection light path for projecting an image on a display screen.

5. The projection device of claim 1 wherein:
said micromirrors further reflect said intermediate light flux transmitted along a plurality of intermediate light flux cross sections with some of said cross sections overlapped partially with an optical pupil of an image projection lens and other intermediate light flux cross sections totally separated from said optical pupil of said image projection lens.

6. The projection device of claim 1 wherein:
said micromirrors further reflect said intermediate light flux transmitted along a plurality of intermediate light flux cross sections with some of said cross sections having different cross section areas from an area of an optical pupil of an image projection lens along a projection light path for projecting an image on a display screen.

7. The projection device of claim 1 wherein:
said micromirrors further reflect said intermediate light flux transmitted along a plurality of intermediate light flux cross sections with some of said cross sections having different cross sectional shapes from a cross sectional shape of an optical pupil of an image projection lens along a projection light path for projecting an image on a display screen.

8. The projection device of claim 1 wherein:
said micromirrors further deflects to said ON direction to reflect a projection light along a projection optical axis with a projection light flux having a cross section substantially overlapped with an optical pupil of an image projection lens along a projection light path for projecting an image on a display screen; and said micromirrors further reflect said intermediate light to transmit along a different optical axis angularly diverge from said projection optical path with said intermediate light flux having a cross section overlapped partially with an optical pupil of an image projection lens.

9. The projection device of claim 8 wherein:
the light source further comprises a laser light source, and an angle between the projection optical axis and said optical axis of said intermediate light is smaller than or equal to 12 degrees.

10. The projection device of claim 8 wherein:
the light source further comprises a laser light source, and an angle between the projection optical axis and said optical axis of said intermediate light is smaller than or equal to 8 degrees.

11. The projection device of claim 8 wherein:
the projection light path is substantially perpendicular to a surface of over said micromirror, and
said micromirrors further reflect said intermediate light to transmit along a different optical axis angularly between said projection optical axis and an optical path of an illumination light emitted from said light source to said spatial light modulator.

12. The projection device of claim 8 wherein:
said micromirrors further reflect an OFF light when deflected to said OFF direction wherein said OFF light transmitting along an optical axis angular outside of said projection optical axis and an optical path of an illumination light emitted from said light source to said spatial light modulator.

13. The projection device of claim 1 wherein:
said micromirrors further reflect said intermediate light comprising diffraction light fluxes generated from diffraction of illumination lights from the light source diffracted by edges of said micromirrors.

14. The projection device of claim 1 further comprising:
a light attenuator for attenuating said intermediate light reflected from said micromirrors to reduce an average light intensity generated by said intermediate light.

15. The projection device of claim 1 wherein:
the light source for emitting the illumination light further comprises a laser light source or an LED light source.

16. The projection device of claim 1 wherein:
the light source for emitting the illumination light includes sub-light sources for emitting a plurality of colors each transmitted in an optical axis along different direction.

17. The projection device of claim 1 wherein:
the light source for emitting of the illumination light includes sub-light sources for emitting a plurality of laser light sources or LED light sources wherein said controller further controls and adjusts an intensity of the light source, the a number of the sub-light sources for emitting light, or an interval and timing of light emission from each of said sub-light sources.

18. The projection device of claim 1 wherein:
the light source for emitting the illumination light includes sub-light sources for emitting a plurality of laser light sources or LED light sources wherein said controller further controls and adjusts an intensity of the light source, the a number of the sub-light sources for emitting light, or the an interval and timing of light emission from each of said sub-light sources to change the intensity distribution across the cross section of the projected light.

19. The projection device of claim 1 wherein:
the light source for emitting the illumination light further comprising a laser light source for emitting light having a plurality of wavelengths simultaneously for at least a period of time within a frame of a display period.

20. The projection device of claim 1 wherein:
the light source further comprises a plurality of sub-light sources emitting light beams along a plurality of illumination light paths, and reflected by the micromirrors of said spatial light modulator along different light paths.

21. The projection device of claim 1 wherein:
the controller controls the micromirrors to operate in said intermediate state by oscillating the micromirrors between said ON and OFF directions.

22. A projection device receiving a light from a light source through an illumination optics for projecting to a spatial light modulator having a plurality of micromirrors controlled to different deflection angles, said projection device further comprising:
a controller that receives and applies an input signal to control each of said micromirrors to deflect to a first deflection angle along an ON direction and a second deflection angle along an OFF direction and to operate in an intermediate state for reflecting an intermediate light having an intermediate intensity between light intensities reflected by said micromirrors in said ON and OFF directions wherein said micromirrors reflect said intermediate light having a non-uniform and/or asymmetrical intensity distribution across a cross section of an intermediate light flux from the micromirrors; and
an intermediate motion stopper for stopping said micromirrors at an intermediate deflection angle for reflecting said intermediate light with a part of a cross section of said intermediate light to an image projection lens.

23. The projection device of claim 22 further comprising:
at least two drivers for driving the micromirror; and
a second motion stopper for stopping the micromirror at another deflection angle different from the intermediate deflection angle.

24. A projection device receiving a light from a light source through an illumination optics for projecting to a spatial light modulator having a plurality of micromirrors controlled to different deflection angles, said projection device further comprising:
a controller that receives and applies an input signal to control each of said micromirrors to deflect to a first deflection angle along an ON direction substantially perpendicular to a surface across said micromirrors and a second deflection angle along an OFF direction and to operate in an intermediate state for reflecting an intermediate light having an intermediate intensity between light intensities reflected by said micromirrors in said ON and OFF directions wherein said micromirrors reflect said intermediate light having a non-uniform and/or asymmetrical intensity distribution across a cross section of an intermediate light flux from the micromirrors; and an angle between an optical axis of the light emitted from the light source versus the ON direction perpendicular to said surface across said micromirrors is less than or equal to 12 degrees.

25. The projection device of claim 24 wherein:
the angle between the optical axis of the light and a normal to the deflectable spatial light modulating element is smaller than or equal to 8 degrees,
the angle between the optical axis of the light emitted from the light source versus the ON direction perpendicular to said surface across said micromirrors is less than or equal to 8 degrees.

26. A projection device receiving a light from a light source through an illumination optics for projecting to a spatial light modulator having a plurality of micromirrors controlled to to different deflection angles, said projection device further comprising:
a controller that receives and applies an input signal to control each of said micromirrors to deflect to a first deflection angle along an ON direction substantially perpendicular to a surface across said micromirrors and a second deflection angle along an OFF direction and to operate in an intermediate state for reflecting an intermediate light having an intermediate intensity between light intensities reflected by said micromirrors in said ON and OFF directions wherein said micromirrors reflect said intermediate light having a non-uniform and/or asymmetrical intensity distribution across a cross section of an intermediate light flux from the micromirrors; and
said micromirrors further reflect said intermediate light flux in a period within a display frame having a cross section overlapped partially with an optical pupil of an image projection lens along a projection light path for projecting an image on a display screen.

27. The projection device of claim 26 wherein:

said micromirrors further reflect said light flux in said OFF direction to a partial plane including the optical axis of the illumination light and the optical axis of the projection light path.

28. A projection device receiving a light from a light source through an illumination optics for projecting to a spatial light modulator having a plurality of micromirrors controlled to different deflection angles, said projection device further comprising:

a controller that receives and applies an input signal to control each of said micromirrors to deflect to a first deflection angle along an ON optical path and a second deflection angle along an OFF optical path and to operate in an intermediate state for reflecting an intermediate light having an intermediate intensity between light intensities reflected by said micromirrors in said ON and OFF directions wherein said micromirrors reflect said intermediate light having a non-uniform and/or asymmetrical intensity distribution across a cross section of an intermediate light flux from the micromirrors wherein said controller controls said micromirror to deflect to an intermediate optical path along an angular orientation between said ON optical path and said OFF optical path.

29. The projection device of claim 28 further comprising:

a light absorber disposed along said OFF optical path for absorbing an OFF light projected thereto.

30. The projection device of claim 28 wherein:

the intermediate light path lies between the OFF light path and a light path along an illumination light emitted from said light source to said spatial light modulator.

31. The projection device of claim 28 wherein:

the intermediate light path lies between the OFF light path and the ON light path.

32. The projection device of claim 28 wherein:

the light source further comprises a plurality of sub-light sources, and the controller further controls intensities and timing for emitting light from the plurality of sub-light sources to corresponding to the micromirrors to operate in the intermediate state to control the intermediate intensity.

33. The projection device of claim 28 wherein:

the light source further comprises a plurality of sub-light sources, and the controller further controls intensities and timing for emitting light from the plurality of sub-light sources to corresponding to the micromirrors to operate in the intermediate state to control a distribution of the intermediate intensity transmitting along said intermediate light path.

34. The projection device of claim 28 wherein:

the cross section of a light flux projected along said ON light path overlapping with a cross section of a light flux projected along said intermediate light path, and the controller further controls the spatial light modulator to switch between the intermediate light path and the ON light path in a time sequential manner.

35. The projection device of claim 1 wherein:

said controller applies said input signal comprising a digital data to an electrode of each micromirror for moving the micromirror to operate in an intermediate state.

36. The projection device of claim 35 wherein:

said digital data further comprising non-binary data.

* * * * *